United States Patent
Lewis et al.

(10) Patent No.: US 11,475,330 B2
(45) Date of Patent: Oct. 18, 2022

(54) MACHINE LEARNING SYSTEMS AND METHODS FOR AUTOMATED PREDICTION OF INNOVATIVE SOLUTIONS TO TARGETED PROBLEMS

(71) Applicant: dMASS, Inc., Austin, TX (US)

(72) Inventors: Kathryn Lewis, Austin, TX (US); Lionel Wolberger, Mohegan Lake, NY (US); Howard Brown, Guilford, CT (US)

(73) Assignee: DMASS, INC., Austin, TX (US)

( * ) Notice: Subject to any disclaimer, the term of this patent is extended or adjusted under 35 U.S.C. 154(b) by 314 days.

(21) Appl. No.: 16/894,654

(22) Filed: Jun. 5, 2020

(65) Prior Publication Data
US 2020/0387812 A1 Dec. 10, 2020

Related U.S. Application Data
(60) Provisional application No. 62/857,810, filed on Jun. 5, 2019.

(51) Int. Cl.
| | |
|---|---|
| *G06F 21/00* | (2013.01) |
| *G06N 5/04* | (2006.01) |
| *G06N 20/00* | (2019.01) |

(52) U.S. Cl.
CPC .............. *G06N 5/04* (2013.01); *G06N 20/00* (2019.01)

(58) Field of Classification Search
CPC .......... G06N 5/04; G06N 20/00; G06N 5/022; G06N 20/20
See application file for complete search history.

(56) References Cited

U.S. PATENT DOCUMENTS

| | | | | |
|---|---|---|---|---|
| 9,417,637 | B2* | 8/2016 | Matsuoka | G06N 20/00 |
| 11,170,445 | B2* | 11/2021 | Irwin | G06Q 40/123 |
| 11,295,542 | B2* | 4/2022 | Deng | H04W 4/02 |
| 2006/0173920 | A1 | 8/2006 | Adler et al. | |
| 2010/0174671 | A1 | 7/2010 | Brooks et al. | |
| 2011/0307228 | A1 | 12/2011 | Kasabov | |

(Continued)

OTHER PUBLICATIONS

Corbett-Davies et al. "The measure and mismeasure of fairness: A critical review of fair 1-20 machine learning." In: arXiv preprint. Aug. 14, 2018 (Aug. 14, 2018) Retrieved on Aug. 2, 2020 (Aug. 2, 2020) from <https://arxiv.org/pdf/1808.00023.pdf> entire document.

*Primary Examiner* — Mahfuzur Rahman
(74) *Attorney, Agent, or Firm* — Stinson LLP

(57) ABSTRACT

A machine learning server is provided for predicting innovations in one or more scenarios. The machine learning server includes a processor and a memory in communication with the processor. The processor is configured to receive a user input, define a scenario profile based on the user input, apply a first trained machine learning model to the scenario profile to generate at least one target associated with the scenario, wherein the at least one target includes a measurable outcome, prompt for a user selection from the target, apply a second trained machine learning model to the scenario profile and the user selection from the at least one target to generate at least one candidate innovation predicted to achieve the measureable desired outcome, obtain descriptive information related to the at least one candidate innovation, and present the descriptive information related to the at least one candidate innovation.

20 Claims, 17 Drawing Sheets

(56) References Cited

U.S. PATENT DOCUMENTS

| | | | |
|---|---|---|---|
| 2016/0092641 A1* | 3/2016 | Delaney | G16H 40/20 |
| | | | 705/3 |
| 2016/0110657 A1 | 4/2016 | Gibiansky et al. | |
| 2017/0220928 A1 | 8/2017 | Hajizadeh | |
| 2019/0102835 A1* | 4/2019 | Bjonerud | G06Q 40/025 |
| 2019/0197430 A1* | 6/2019 | Arditi | G16H 50/20 |
| 2020/0117900 A1* | 4/2020 | Deng | H04W 4/38 |

* cited by examiner

MACHINE LEARNING SYSTEMS AND METHODS FOR AUTOMATED PREDICTION OF INNOVATIVE SOLUTIONS TO TARGETED PROBLEMS

CROSS REFERENCE TO RELATED APPLICATIONS

This application claims priority to U.S. Provisional Application No. 62/857,810 filed on Jun. 5, 2019, which is hereby incorporated by reference in its entirety.

FIELD OF INVENTION

The field relates to machine learning systems, methods, and architectures for automated prediction and recommendation of innovative solutions to targeted problems identified by the machine learning systems.

BACKGROUND OF THE DISCLOSURE

Identifying innovative solutions within complex fields is a complex, yet necessary activity. In order to improve present technologies, research, development, inventions, processes, supply chains, coordinated activities, and other endeavors, there is a persistent demand to look for ways to improve each and every field. One approach to such innovation is to consult the state-of-the-art and identify deficiencies and problems. However, this approach is extraordinarily labor intensive and requires constant attention to changes in the knowledge base for a given field.

Generally, subjects or topics may be associated with significant corpuses of literature, documents, and other text that describes the state of knowledge within a field. The corpus for each field often entails massive corpus of thousands or millions of texts. In many fields, the corpus is constantly expanding. Because of such complexity and evolution, identifying areas with significant unsolved problems is a complex endeavor. Identifying potential solutions is an even more complex undertaking than identifying problems. Indeed, identifying potential solutions requires knowledge of the state-of-the art in fields, identifying areas for innovation, and determining possible advancements in those areas.

Moreover, many options for solving a problem may not work or will be sub-optimal. Identifying potential solutions requires analysis of the intricacies of each problem set based on known state-of-the art and the literature of each field.

To address the need for improved methods of identifying innovation in fields, disclosed herein are machine learning systems, methods, and architectures for automated prediction of innovative solutions to predicted target problems determined by the machine learning systems.

BRIEF SUMMARY OF THE INVENTION

In one aspect, a machine learning expert system is provided for predicting that innovations will meet target goals in one or more scenarios. The machine learning expert system includes a processor and a memory in communication with the processor and storing processor-executable instructions. When executed by the processor, the instructions configure the processor to receive a user input related to a scenario, define a scenario profile based on the user input, apply a first trained machine learning model to the scenario profile to generate at least one target associated with the scenario, wherein the at least one target includes a measurable desired outcome, prompt for a user selection from the at least one target, apply a second trained machine learning model to the scenario profile and the user selection from the at least one target to generate at least one candidate innovation predicted to achieve the measureable desired outcome, obtain descriptive information related to the at least one candidate innovation, and present the descriptive information related to the at least one candidate innovation to a user.

In another aspect, a method is provided for predicting that innovations will meet target goals in one or more scenarios. The method includes receiving a user input related to a scenario, defining a scenario profile based on the user input, applying a first trained machine learning model to the scenario profile to generate at least one target associated with the scenario, wherein the at least one target includes a measurable desired outcome, prompting for a user selection from the at least one target, applying a second trained machine learning model to the scenario profile and the user selection from the at least one target to generate at least one candidate innovation predicted to achieve the measureable desired outcome, obtaining descriptive information related to the at least one candidate innovation, and presenting the descriptive information related to the at least one candidate innovation to a user.

In yet another aspect, a machine learning server is provided for predicting that innovations will meet target goals in one or more scenarios. The machine learning server includes a processor and a memory in communication with the processor. The processor is configured to receive a user input related to a scenario, define a scenario profile based on the user input, apply a first trained machine learning model to the scenario profile to generate at least one target associated with the scenario, wherein the at least one target includes a measurable desired outcome, prompt for a user selection from the at least one target, apply a second trained machine learning model to the scenario profile and the user selection from the at least one target to generate at least one candidate innovation predicted to achieve the achieve the measureable desired outcome, obtain descriptive information related to the at least one candidate innovation, and present the descriptive information related to the at least one candidate innovation to a user.

BRIEF DESCRIPTION OF THE DRAWINGS

The disclosure will be better understood, and features, aspects and advantages other than those set forth above will become apparent when consideration is given to the following detailed description thereof. Such detailed description makes reference to the following drawings, wherein.

In the drawings, reference numbers may be reused to identify similar and/or identical elements.

DETAILED DESCRIPTION

Figure 1:
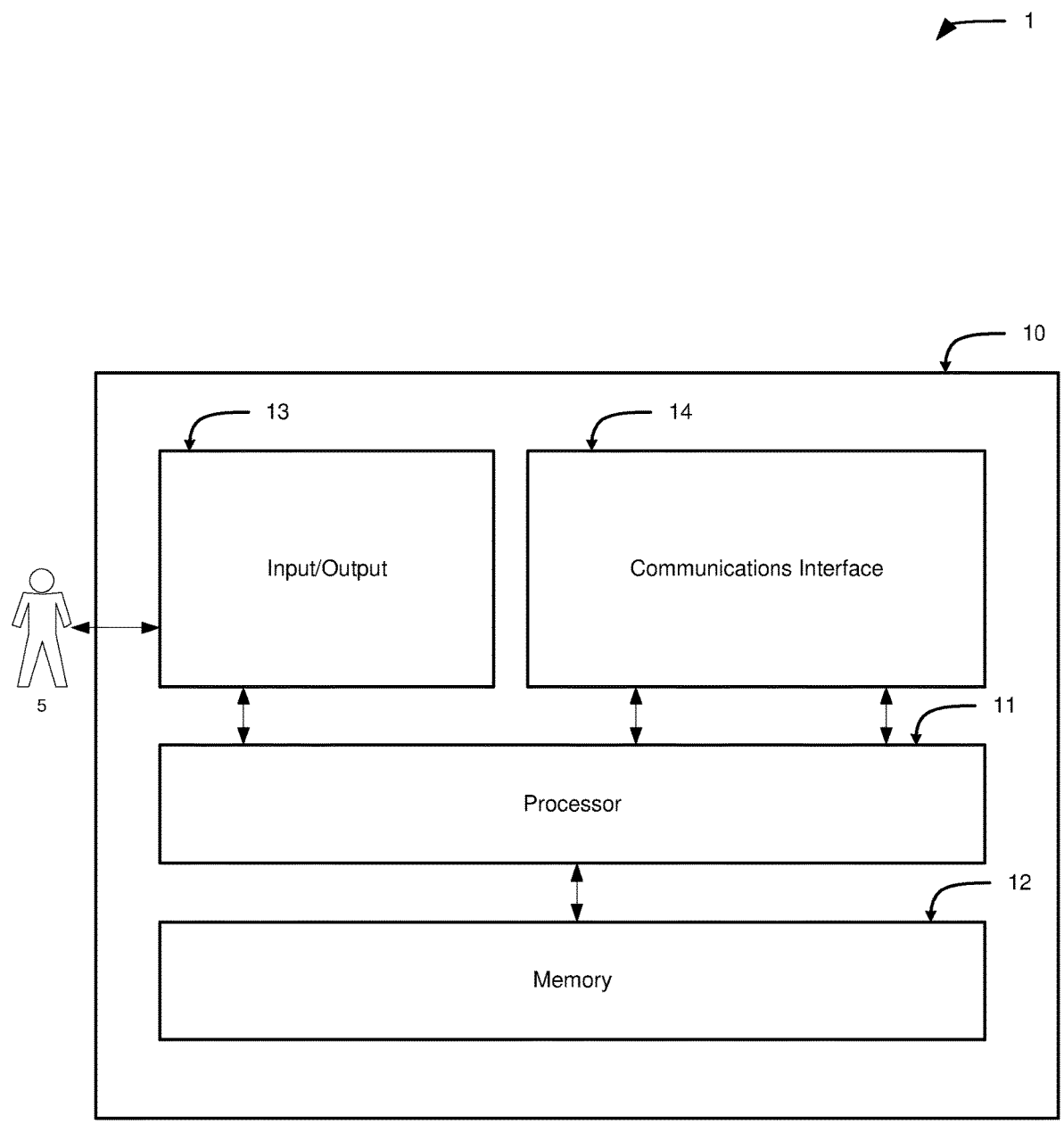
FIG. 1 is a functional block diagram of an example computing device that may be used in the innovation intelligence machine learning system described.

Unless defined otherwise, all technical and scientific terms used herein have the same meaning as commonly understood by one of ordinary skill in the art to which the disclosure belongs. Although any methods and materials similar to or equivalent to those described herein can be used in the practice or testing of the present disclosure, the preferred methods and materials are described below.

As discussed above, a known problem in fields of research, development, and technology is identifying areas for innovation, and recommended approaches to such innovation. Described herein are machine learning systems, methods, and architectures for automated prediction of innovative solutions to predicted target problems determined by the machine learning systems. The machine learning systems utilize complex training models, supervised learning, and artificial intelligence models to identify innovation. The systems described also utilize additional technological solutions to provide the benefits described including: (a) custom methods to reinforce artificial intelligence with human computer interfaces ("HCI"); (b) new machine learning protocols in "closed loop" artificial intelligence models; (c) domain-specific algorithms for identifying industrial innovation; (d) domain-specific processes; and (e) value distillers. In particular, the described approaches to machine learning and artificial intelligence represent technological improvements rooted in technology that improves the functioning of the computing systems described, and solves known technological problems.

In an example embodiment, the systems described include a system that may be referred to as an Innovation Intelligence Expert System ("IIES"). The IIES is a digital system that is configured to recommend innovations that, if adopted, improve the chances of achieving a target or goal to address a known problem or challenge. In an example scenario, a user seeking to identify an innovation in a field uses the IIES to consider scenarios for applying innovations to address a problem in the field, obtain a preferred outcome (a "target state"), avoid risks of negative impacts ("risk target state"), or obtain solutions from a target state that have not previously been achieved in the field.

In such examples, a user may access the IIES and provide a preliminary description of a field and context where the user may seek to identify innovation. The field and context may be referred to as a "scenario". The IIES provides a prompt to the user to add additional information including elaboration of the scenario and classificatory entities. The IIES is an interactive system that processes the scenario information and additional information to provide a set of candidate innovations using the methods described herein. The IIES recommends candidate innovations based on its prediction that such innovations would increase a likelihood of positive target states (or risk target states) in the scenario if the innovations are implemented.

By way of example, the IIES is capable of providing benefits described in the following examples. In a first example, an enterprise with $10 billion in revenues in a business unit seeks to discover disruptive innovations that, if adopted by competitors, would threaten the business unit's core business. These conditions form the basis of the scenario that is provided to or received by the IIES. In response, the IIES recommends an innovation that describes a new method of delivering on a core value proposition of the business unit that is also a core value proposition of another unrelated industry. When such a new method is adopted by the business unit, this method results in the enterprise's business unit continued success and reduced risk target state.

In a second example, a business unit of $100 million annual revenue seeks environmentally sustainable yet profitable improvements in its processes. The conditions of the business are input into a scenario at the IIES. The IIES recommends a technological process or material from within the industry or from an unrelated industry that it predicts, if adopted, results in a more environmentally sustainable process with higher levels of profit, improving the target state.

In a third example, an organization of over one hundred thousand members seeks innovative ways of operating under its charter. The conditions of the organization are input into a scenario at the IIES which predicts that a new method of social interaction will, if adopted, result in the organization functioning better and more efficiently achieving its goals, thus improving the target state.

The systems and methods described, including the IIES, utilize an object-based architecture. Example objects used by the system include the following objects, described below: (a) sources, (b) scenarios, (c) classifiers, (d) targets, (e) innovations, and (f) transformer neural networks using attention-based mechanisms. In some examples, additional objects are utilized by the systems and methods to provide the benefits described. The objects are used within the context of the methods described herein.

As described herein, a "source" is a machine-readable digital object used as an input by the systems and methods.

Sources may include machine-readable data of any form including, without limitation, text, audio, video, photograph, graphic design files, or other formats or types. Exemplary sources include, a corpus of text or other literature, schematics, diagrams, audio, and video. In some examples, a machine-learning model may be used as a source as well. Sources may be further associated with a source type or a "source genre". Source types or source genres may be provided with sources and used to specifically process the source (and, for example, decompose the source) into entities based on the source type. Source types may include, for example, media articles, advertisements, patent literature, research journals, websites, conference sessions, corporate literature, job placements, social media posts, case studies, case law and legal opinions, legal decisions, educational materials, legislative materials, and other suitable source types. Depending on the type and convention of source, different processing methods or approaches may be used.

As used herein, a "scenario" is a description of conditions of significance in the context of the systems and methods, including the IIES, and the users. A scenario may be identified, explained, and/or described using a source or a combination of sources. For example, a source (e.g., an article) may describe a scenario fully or partially, or the IIES may process multiple sources (from multiple source types) to derive the scenario. Scenarios are identified, explained, and/or described to provide context to a particular instance of the systems described and to allow them to recommend candidate innovations that will improve a particular scenario. Such improvement may include, for example, improving a target state, decreasing a target risk state, accessing opportunities, or any other desirable outcome. Scenarios are thus processed by the systems with the objective of achieving certain outcomes (or targets). Thus, the result of system processing is one or more recommended innovations that describe alternative methods, approaches, partnerships, business models, or changes that one may consider in an application for a given scenario.

Scenarios may or may not include the primary stakeholders who conceived, operate and describe the scenario. Such identification may assist with determining whether target states are achieved for such stakeholders and/or whether they vary for particular stakeholders. Scenarios may also include identification and enumeration of deficits of scenario either explicitly or implicitly including, for example, identifying known problems or challenges. Scenarios may also include contextual information for the scenario including details of where, when, and how the scenario occurs and environmental conditions including resources. Scenarios may also include the significance of the scenario and factors that establish the scenario as important. Scenarios may further include the impact of the scenario on stakeholders, populations, and/or bystanders. Scenarios may also include possible downsides and its associated adverse effects. Scenarios may additionally include potential and/or known benefits from eliminating any problems or characteristics inherent in the scenario. Scenarios may also include descriptions of previous attempts at innovating on the scenario including known reasons for failure. Scenarios may include any background conditions where innovations may be provided including, for example, descriptions of industrial processes, descriptions of scientific research in a field, descriptions of environmental conditions, descriptions of public institutions, and descriptions of corporate ecosystems.

As used herein, a "target" is a result that may be predicted or determined when a particular innovation is applied in the context of a scenario. As explained, targets may refer broadly to positive improvements to conditions, mitigations of risk, or any other desirable outcome that can be quantified. A target may apply to one quantifiable metric (e.g., revenue or cost of a particular project) or include a function or index that incorporates multiple underlying metrics. The systems and methods described are configured to make predictions of the targets associated with innovations. As a result, the targets serve as guiding metrics and are applied by the system to identify relevant candidate innovations for recommending, and for sorting and/or filtering from candidate innovations to identify those that provide maximized predicted utility for targets. After identifying targets, the system makes predictions for target outcomes for each candidate innovation. Thus, target values for each innovation are assessed as to their efficacy, and filtered and sorted to provide relevant innovations with desired targets for each scenario. In an example embodiment, information to define a target contains one or more of the following characteristics (whether explicit or implicit), which are either part of the target or derived from the target: (a) definitions of boundary values or conditions, (b) constraints and conditions such as strategies or activities that are applied to control the steps performed by the system including Processes (defined below), further including both how such steps are applied and how results are assessed; (c) one or more operational guidelines for identifying a candidate innovation (also referred to as a "Recommendation"); (d) tests to apply to a candidate innovation; (e) identification of issues of primary concern to the candidate innovation; (f) metrics relevant to assessing to what degree an candidate innovation, if adopted, will make a scenario improve with respect to a target; (g) procedures to select candidate innovations; (h) objective or subjective criteria for decision-making on selecting candidate innovations; and (i) suggested metrics, objectives, or outcomes that are to be avoided or deprecated in a possible candidate innovation. Targets may include, for example, the aggregate amount of environmental pollution from a process, profit or revenue from a project or product, market penetration, and metrics related to disruption in a field. Targets may also include parameters to define the direction of maximization (e.g., more revenue or profit is desirable, but less environmental pollution is desirable) and minimum satisfactory metrics for an innovation (defined by, e.g., break-even points).

As described herein, an "innovation" is a source, or a set of sources that describe a scenario deemed to have some innovative characteristics. Innovations, in the context of the systems and methods described, have been derived from publicly available resources, open source content, and/or recommended into the system by the innovator himself. In some examples, innovations are defined or extrapolated by the systems whether based on source input or otherwise. As described herein, the system recommends candidate innovations to one or more users based on predicted targets and a candidate innovation is adopted to achieve a target.

In the example embodiment, innovations are processed and determined by the system in accordance with the targets. Thus, candidate innovations are recommended based on their impact to targets in the scenario(s). The candidate innovations include descriptions for the particular recommended innovations. In some examples, the candidate innovations may also include some or all of the following: (a) the primary stakeholders who conceived, operated, and described each innovation; (b) the context relevant to the innovation; (c) the significance of the innovation; (d) the impact of the innovation on stakeholders, populations, and/ or bystanders; (e) anticipated and/or known costs and benefits of each candidate innovation; (f) factors that establish the candidate innovation as significant; (g) comparisons of other scenarios where other innovations were applied to achieve targets similar to what the candidate innovation is intended to accomplish and the results of such other innovations in other scenarios; (h) details of where, when, and how the candidate was conceived; (i) alternative methods of implementing the candidate innovation; (j) steps to be performed (including any prescribed order) in order to deploy the candidate innovation; and (k) known costs and logistics for the candidate innovation.

As described herein, "innovation characteristics" are a set of data derived innovation data representing a distillation of descriptions of innovations into machine-readable texts that may be stored in the system and used as an innovation source. The systems and methods described may utilize suitable information processing algorithms to derive innovation characteristics from innovations (including candidate innovations). Examples of innovation characteristics include functionality that brings increased efficiency in an innovation, or a more sustainable way of processing a product after applying an innovation. Innovation characteristics may also include new capacities based on new technical approaches. By way of an example, where an innovation includes use of carbon fibers instead of steel in a product manufacturing process, innovation characteristics may include the impacts of such a change to cost, sustainability, and revenue. Where an innovation includes hosting plastic recycling bins on mobile buses, innovation characteristics may similarly include the impacts of such a change to recycling throughput, adoption, cost, sustainability, and revenue.

As used herein, an "innovation-seeker" is a user of the systems and methods, including of the IIES. An innovation-seeker may engage with the IIES platform (or other similar systems) to engage in one or more of the following innovation-centered activities: (a) to seek an innovation in order to solve a problem associated with a scenario; (b) to seek an innovation in order to capitalize on new potential opportunities; (c) to seek inspiration on looking at problem-solving differently; and (d) to maximize opportunities within a given scenario. An innovation-seeker may include a representative, participant, member, manager, or leader from a company, governmental entity, academic institution, or non-profit organization.

As described herein, a "supplementary source" is a source that can be used to enrich or enhance the sources for improved processing by the methods described herein, including machine learning, human-in-the-loop processing, natural language processing ("NLP"), artificial intelligence, and other related processes. Supplementary sources may relate to sources (which may also be referred to as "primary sources") in one or more ways: (a) supplementary sources may further explain information from primary sources; (b) supplementary sources may elaborate on information from primary sources; (c) supplementary sources may define information from primary sources; (d) supplementary sources may illustrate information from primary sources and use; (e) supplementary sources may define contexts for the primary sources; (f) supplementary sources may explain or amplify the significance of information from the primary sources or the impact of the primary sources; (g) supplementary sources may explain the environmental impact of information from the primary sources; (h) supplementary sources may describe the source from other perspectives; and (i) supplementary sources may provide alternative media for information from the primary sources.

As described herein, a "risk target" is a target associated with one or more negative outcomes (e.g., potential threats) that an innovation-seeking user may seek to avoid. An innovation seeker may seek a candidate innovation to accomplish a target state and/or to avoid a risk target state. In some examples, the risk target may include one or more of the following characteristics: (a) an enumeration of stakeholder roles who will be adversely impacted by the negative outcomes; (b) identification and enumeration of adverse effects, quantitatively and/or qualitatively, that may occur if the risk target occurs; (c) possible external benefits that could accrue to any party should the risk target occur without mitigation; (d) details of where, when, and how the risk target occurs; (e) the context of the risk target; (f) the significance of the risk target and factors that establish the risk target as important; (g) the impact of the risk target on stakeholders, populations, and/or bystanders; (h) the potential benefits and costs of eliminating the risk target; and (i) descriptions of previous attempts at mitigating the risk target and the results of such attempts. Risk targets may include, for example, negative outcomes from climate change such as flooding a manufacturer's factories or customer sites, impact on a pandemic to supply chains, a competitor disrupting a business, changing to sourcing materials that could threaten production, and the impact of variable pricing on profits.

As described herein, a "recommendation" is a recommended innovation (or a candidate innovation) that is returned by the system because it is predicted to improve a likelihood of achieving desired targets in a scenario (whether avoiding risk targets or achieving positive targets). An example of a recommendation or a "candidate innovation" may be an innovation of an algae-grown textile that is predicted to produce low environmental impact and high revenue, while being relevant to a textile manufacturer's customers and production processes.

As described herein, a "match" occurs when a user selects a candidate innovation or recommendation that is provided by the system (including the IIES) as satisfactory. Selection of a match causes the connection of sources and scenarios with a recommendation (or candidate innovation) selected in the match. In one aspect, a match expresses the expectation that the application of the recommendation to the scenario will achieve desired target states (or avoid risk target states). In some examples, stakeholders who may create, distribute, codify, promote or operate the candidate innovation, may use the system to identify new stakeholders interested in their candidate innovation based on the match. Such identification could be used to find new business opportunities, markets and growth potential for the candidate innovation. The system may also include scoring regarding the degree to which the match satisfies the target state or mitigates the risk target state. An example of a match may include where an end user, having entered into the system the scenario of improving plastic recycling, is recommended a candidate innovation for a new way of recycling, wherein the user declares the innovation to be a match and indicates that the candidate innovation is satisfactory.

In some examples, the systems and methods determine a value (referred to as a "naked value") for each innovation. A "naked value" represents the value that a candidate innovation represents when isolating for benefits delivered to users. In this respect, innovations may be regarded as delivery mechanisms for creating benefits. As such, naked value metrics isolate the value that is most significant to a stakeholder, multiple stakeholders, or a group. In one example, naked value is a ratio between the number of benefits relevant stakeholders receive and the amount of resources required to achieve those benefits. This approach allows for optimizing of the most benefit with the lowest amount of resources.

As described herein, a "classifier" is an object used to classify sources (whether they are primary or supplementary sources). Classifiers include sub-objects for (1) type; (2) class; (3) entity; (4) chain; (5) process; (6) hypothesis; and (7) negative/positive statements. In one respect, classifiers provide an organizational hierarchy for classifying sources and information.

As described herein, "transformer" may be described as a model architecture eschewing recurrence and instead relying entirely on an attention mechanism to draw global dependencies between input and output. Transformers are used by the expert machine learning system to, for example, correlate content that was previously unrelated based on classification. As such, transformers are used for predicting targets, hypotheses, candidate innovations, and performing other tasks including content enrichment.

A type has one or more classes as members that, by virtue of the type definition, are contained within the type. Classes in a given type can be correlated in accordance with the characteristics of the type, with such correlation deriving its relevance, meaning and function depending on the nature of the type itself. A type may include all industrial classifications, all functional classifications, or all organizational classifications.

A class has one or more entities as members that, by virtue of the class membership rules, are contained within the class. Entities in a given class can be correlated in accordance with the semantics of the membership rules, with the characteristics and effects of such correlation deriving their relevance, meaning and function from the class itself. Classes may enforce on their members correlations such as (a) continuous, discrete; (b) inclusion and exclusion; and (c) hierarchical or heterarchical. As used herein, "heterarchical" refers to organizations where members of the class have unknown rules governing membership in the class and is distinct from "hierarchical" which refers to organizations where members of the class have known rules governing membership in the class. Thus, classes can encompass elements with no known ordering or organizational rules. Classes may be defined by lists or arrays, conditional data (e.g., geographical or temporal restrictions), or language rules. Examples of a class may include, for example, industrial classification codes (e.g., the North American Industrial Classification Scheme ("NAICS")), geographical regional definitions, industry groupings such as the Fortune 500, United Nations Sustainability Goals, and heterarchical classes.

An entity is a text label used as a classifier. An entity may include a numerical metric, a unit of measurement, a dictionary definition, or any relevant similar discrete unit that may be derived from and/or associated with a source. An entity may or may not be associated by a predicate that expresses the semantics of the association to the source. An entity may be associated with one or more sources in order to expand the corpus associated with the entity. An entity may also be associated with a source in order to classify the source. An entity may additionally be associated with a supplementary source to explain, elaborate upon, more narrowly define, or illustrate the entity. Some entities may be curated into classes, while others may be standalone. An entity may include a label or name for an industry, a product, a manufacturing step, or a location.

A chain refers to a relationship between parts and a whole. A chain may include multiple chained events, chained dependencies, or formal mathematical models such as mereological analytical models that describe part-to-whole relationships and part-to-part relationships within a whole. A chain may include, for example, a supply chain for a product or service, a manufacturing process for a product, or a product life cycle. A part/whole relationship is a series of parts—classes, entities, or mixtures of the two—that when actioned, enacted, assembled, or otherwise implemented in their appropriate process and order reach a state of completion. The relationship of parts to whole may or may not be physical, cognitive, or both. In some examples, details of where, when and how the part/whole relationship operates may be specified to great detail or more generally. In some examples, a clear definition of the relationship between parts both to one another and to the whole may be present. Such relationship information may or may not have the following characteristics: (a) collectively possessing a clear consistency and similarity across the entire part/whole relationship, or having inconsistent and dissimilar qualities across the entire part/whole relationship; (b) the parts may be separated, or not, in any time, space, energy or suitable qualitative metric; (c) parts may be simple units or whole organizations of people involved in complex activities; (d) the parts may relate to one another in a relation of mutual dependence or independence; (e) steps in the part/whole relationship may pass through all parts, or some of the parts, or vary each time the part/whole relationship is enacted; (f) the part/whole relationship may or may not specify stakeholders who conceive, operate and assess the part/whole relationship; (g) the context of the scenario and its environment; (h) the significance of the part/whole relationship's various parts and steps, and factors that establish certain parts as important and others as less important; (i) the potential failure modes of the part/whole relationship or any of its parts; and (j) descriptions of alternative part/whole relationships that can achieve the same result.

A process is a set of operations or steps that take as input objects including sources, entities, and classes, and output processing results. Processes may extract, transform or re-render texts as needed to obtain results useful to the system. Processes may perform deep semantic analysis, natural language processing, rich multi-faceted analysis, transformer neural networks using attention-based mechanisms, and simulations, as well as generate hypotheses and perform graph inference. Processes may also assess class inclusion versus exclusion for entities, classes, types, and other elements. Some processors use mature NLP techniques such as entity extraction, term frequency-inverse document frequency (TF-IDF) and vector processes (e.g., word2vec).

Other processors may work via the human computer interface ("HCI"), eliciting responses from the innovation-seeker. The major processes include hypothesis and domain-specific processes, described below. Other processes are more complex and are discussed in detail below. Some examples of processes include running an entity recognition process to extract entity names, identify a label for entities, and label a source. An exemplary process described herein includes processing a corpus of literature to assist a user in identifying a scenario in which they seek innovation, recommending an innovation for the scenario, and receiving a match.

As used herein, a "hypothesis" is an output of a process referred to as a "hypothesis generation process". A hypothesis generation process is an algorithm that generates hypotheses for candidate innovations as being suitable to respond to a scenario to achieve a target state. Hypotheses are assessed based on the target and other criteria described herein. In some examples, the hypothesis generation process may be trained based on matches. If a user selects a particular hypothesis (i.e., an output candidate innovation), that hypothesis is determined to be relevant and used to train the algorithm. If the user does not select a particular hypothesis, that hypothesis is determined to not be relevant and used to similarly train the algorithm. An example of a hypothesis is that a material product be created that avoids use of processes and precursors associated with a risk target and instead uses certain substitute processes and precursors. In some examples, the hypothesis generator process may create precursor hypothesis to identify possibilities within given confidence intervals.

The systems and methods described also utilize negative and positive statements to process source, scenario, target, hypotheses, and other objects. Negative statements include gaps, lacks, holes in capability, negative language convert to positive assertions. The systems and methods described have the capacity to transform negative statements into positive statements and vice versa. This feature is significant because it allows the systems and methods to match across a broader corpus and to, for example, identify sources with information that respond to a negative requirement. Thus, the system may map negative to positive statements to identify candidate innovations. Where a requirement for a scenario is to reduce output of carbon, for example, a statement in a source may state "carbon output is produced in excess in this process", and a supplementary source used to identify a candidate innovation may reference a similar but modified process and note "excess carbon is not produced by applying this approach." In such an example, the system may associate the supplementary and primary source and identify the referenced modified process as a candidate innovation.

Described below are specific implementations of the methods that may be performed by the systems described, including a machine learning expert system that may be referred to as the Innovation Intelligence Expert System ("IIES"). In an example embodiment, the IIES includes a machine learning server including a processor and a memory. In the example embodiments, the machine learning server is in communication with a database. In some examples, the machine learning server also is in communication with a secondary database and/or external systems including third-party data. The machine learning server includes a machine learning layer configured to perform the processes described herein. The machine learning layer may further include components including an entity extraction and classification component, a calculator component, and a pattern association component. The machine learning server also provides a user interface to provide output to a user and receive input. The user interface may be provided directly at the machine learning server through suitable displays and input/output devices. In some examples, the user interface is provided through a secondary user computing device that is in communication with the machine learning server. This description is intentionally brief, and a more detailed discussion of the system architecture is provided below.

In an example embodiment, the machine learning server is configured to a) train machine learning models for i) generating targets based on a particular scenario, and ii) generating hypotheses to identify candidate innovations predicted to provide a positive target state for the particular scenario; and b) apply the trained machine learning models for i) generating targets based on a particular scenario, and ii) generating hypotheses to identify candidate innovations predicted to provide a positive target state for the particular scenario. In some examples, the machine learning server is further configured to a) train machine learning models for i) enriching and refining scenarios provided by users based on source information; ii) enriching scenarios based on part/whole analysis, mereological analysis, and chain analysis, and iii) textually processing statements for sentiments to apply to improve hypothesis generation; and b) identify trends based on source information to enrich and refine scenarios based on trend analysis.

The machine learning server is in communication with other devices that may provide it with relevant datasets including, without limitation, sources (including primary and supplementary sources). As described herein, sources include a broad corpus of information that may be associated with a large variety of source types and source classes. Sources may be originally derived from public information, subject matter expert information, proprietary information related to the IIES, and third-party information that is not public. In the example embodiments, sources can be processed to extract a variety of relevant objects and features from the sources including, without limitation, targets, hypotheses, candidate innovations, statement enrichment, trend characteristics, part/whole datasets, and scenarios. The machine learning server also has access to methods including scraping, user interfaces, human computer interface ("HCI"), and data migration and loading tools including extract, transformation, and loading ("ETL") tools which may be used to migrate or move data described including sources.

In an example embodiment, the machine learning server receives a user input that relates to a scenario. In one example, the user input is provided in text. In other alternatives, the user input may be provided using structured data, audio, video, images, or any suitable media. The machine learning server processes the user input to define a scenario profile. A scenario profile refers to an expanded, elaborated, or defined version of a scenario. In many examples described herein, a user input describes a scenario at a lower level of detail. A scenario profile includes elements that may further define the scenario, and therefore constitute a collection or profile. A scenario profile may also be referred to as a scenario collection.

Defining the scenario profile (or collection) may include parsing statements from the user input and classifying the parsed statement(s) with relevant objects including, without limitation, statement type, statement class, statement entities. In an example embodiment, the machine learning server assesses the vocabulary of each source by applying classifiers to identify the type (or genre), class, and/or entity for each source. In some embodiments, the machine learning server initially decomposes each source into component elements (such as, for example, sentence fragments from a textual source) before classifying the component elements into types, classes, or entities. The classification models described may utilize natural language processing methods to identify relevant attributes of each source (or component) used for further classification including, without limitation, mature NLP techniques such as entity extraction, term frequency-inverse document frequency (TF-IDF), vector processes (e.g., word2vec), and transformer predictions based on attention mechanisms. Sources with common vocabulary may be grouped into common types or classes where they have sufficient overlapping attributes. Entities may be determined by applying similar techniques to find a label or label most likely to associate with a source or component.

In the example embodiment, classification tools and related classes, types, and entities are available to the machine learning server. Additionally, the machine learning server is configured to utilize networked models that utilize an attention mechanism to provide transformations and provide dynamic relationships between previously unrelated information. Likewise, all objects and processors described above are available to the machine learning server.

As described below, in some examples the scenario profile is defined by the machine learning server performing at least one statement enrichment process, typically using a machine learning model, to add details to the scenario indicated by the user input. In one example, the machine learning server identifies a statement type associated with the user input and applies a trained content enrichment machine learning model to identify enrichment content (e.g., statements from one or a plurality of sources that may elaborate on the statement(s) in the user input describing the scenario, or may predict related and logical terms that elaborate on the statement(s) in the user input describing the scenario).

In one example, the content enrichment machine learning model is trained using the following approach. A corpus of sources (e.g., sources or supplementary sources) are provided to or received by the machine learning server (using, for example, the database). The corpus includes documents which each include components (e.g., sentences and sentence fragments). In some examples, each component is classified using classifier algorithms into classes, types, and entities. The machine learning server decomposes each item of the corpus. The machine learning server performs training cycles wherein a user provides a training input related to a training scenario. The training input is used to define a training scenario profile. In some examples, the training input is decomposed into component parts. (In some examples, the machine learning server also applies the classifier to the training input and identifies the at least one component based on overlapping classification between the at least one component and the training scenario.) The machine learning server provides at least one component of the corpus to a user as training enrichment content, to determine whether the at least one component relates to the training scenario. The machine learning server receives an enrichment training response indicating whether the selection (the at least one component) of the set of training enrichment content relates to the training scenario. In some examples, the enrichment training response is a binary or Boolean where the user may identify the at least one component as either relevant or not relevant. In other examples, the user may provide a relevancy score or ranking to indicate a relative relevancy. In further examples, the user may rank or score the at least one component based on context, such that the machine learning model may train for relationships between scenario context and enrichment context. The enrichment training response is used to train the content enrichment machine learning model. In operation, when the machine learning server applies the trained content enrichment machine learning model, the machine learning server may continue to re-train the model based on feedback. As such, a user may provide enrichment training responses in response to a trained content enrichment machine learning model to allow the model to continue to be refined.

In some examples, the machine learning server also applies a trained negative-to-positive machine learning model to process statements in the system. The negative-to-positive machine learning model is used to enrich content with information that is relevant, while appropriately controlling for content that is contrary to an assertion. For example, a scenario may be provided as a negative limitation such as, "it is desirable to reduce the output of a particular hazardous chemical during the manufacture of a particular product." The corpus available to the machine learning server may contain information related to the hazardous chemical and/or the particular product, but the machine learning server is used to provide hypotheses and candidate innovations in positive expressions. Thus, the machine learning server attempts to identify information that would identify the steps that could be taken to meet the above negative limitation, although they are described positively. Processed statements may include components or the entirety of any statements provided to or received by the machine learning server including, without limitation, sources (e.g., primary and supplementary), scenarios, targets, candidate innovations, trends, and hypotheses. The negative-to-positive machine learning model is trained as follows. A training assertion input is received by the machine learning server. As above, and in all examples of training, a corpus of sources (e.g., sources or supplementary sources) are provided to or received by the machine learning server (using, for example, the database). The corpus includes documents which each include components (e.g., sentences and sentence fragments). In some examples, each component is classified using classifier algorithms into classes, types, and entities. Based on the corpus above, the machine learning server receives a corpus of training assertion information (or training assertion content) which is classified and processed in a manner similar to how the corpus for enrichment is processed above. The training assertion input is processed by a language processing algorithm (such as an NLP) which extracts sentiment related to the training assertion input. The training assertion input is also decomposed and classified in a manner similar to the approach of the content enrichment machine learning model. Thus, in some examples, the machine learning server also applies the classifier to the training assertion input. The machine learning server identifies a component of the corpus that matches the training assertion input (and the training assertion scenario) based on overlapping classification between the component and the training assertion scenario. The machine learning server provides the component of the corpus to a user as training assertion content, to determine whether the at least one component relates to the training assertion scenario. The machine learning server receives a training assertion response indicating whether the selection (the component) of the training assertion content relates to the training scenario. The training assertion response is used to train the negative-to-positive machine learning model. In operation, when the machine learning server applies the negative-to-positive machine learning model, the machine learning server may continue to re-train the model based on further feedback. As such, a user may provide training assertion responses in response to a trained negative-to-positive machine learning model to allow the model to continue to be refined.

In another example, the user input is processed with a trained machine learning model for component enrichment and a trained machine learning model for business impact enrichment. In this example, the user input is converted into a scenario profile and the trained machine learning model for component enrichment identifies parts that may correspond to the scenario profile. The trained machine learning model for component enrichment is trained to find, for example, component parts, chains, bills of material, and other aspects of the scenario profile that may assist in defining the scenario profile further. Such additional definition may improve the quality of targets, hypotheses, and scenario enrichment provided by the machine learning server. Similarly, the trained business impact enrichment model is trained to identify, for example, business impacts associated with a particular scenario including, for example, supply chain risks, environmental risks, and pricing risks.

The machine learning model for component enrichment is trained as follows. As above, and in all examples of training, a corpus of sources (e.g., sources or supplementary sources) are provided to or received by the machine learning server (using, for example, the database). The corpus includes documents which each include components (e.g., sentences and sentence fragments). In some examples, each component is classified using classifier algorithms into classes, types, and entities. The corpus may also be classified using whole-to-part or similar part analysis techniques. As such, the corpus may be processed using language processing algorithms to identify documents or texts containing references to compositions, manufacture, supply chains, lifecycle assessments ("LCA"), bill of materials ("BOM"), parts, and other processes and products defining a multi-step or multi-component process or product, or similar information. The machine learning server decomposes each item of the corpus including decomposition into segments related to any identified parts or segments. The machine learning server performs training cycles wherein a user provides a component training input related to a training scenario involving compositions, manufacture, supply chains, lifecycle assessments ("LCA"), bill of materials ("BOM"), parts, components, and other processes and products defining a multi-step or multi-component process or product, or similar products or processes. (Each identified and decomposed part of the sources and input may be further classified using the classifiers described, and including classification by component.) Input may be further classified using the classifiers described, and including classification by component. Alternately, input may be enriched by words predicted by an attention-based process trained on the relevant corpus that predicts relevant terms using a transformer process. The component training input is used to define a component scenario profile. In many examples, the component training input is decomposed into component parts. (In many examples, the machine learning server also applies the classifier to the component training input and identifies the at least one component based on overlapping classification between the at least one component and the component training scenario.) The machine learning server provides at least one component of the corpus to a user as component content, to determine whether the at least one component relates to the component training scenario. In most examples, the component of the corpus selected includes information related to the fact that the component training input and component scenario profile relate to part-to-whole or similar concepts. The machine learning server receives a training component response indicating whether the selection (the component) of the component content relates to the training scenario. The training component response is used to train the machine learning model for component enrichment. In operation, when the machine learning server applies the component enrichment machine learning model, the machine learning server may continue to re-train the model based on further feedback. As such, a user may provide training component responses in response to a trained component enrichment machine learning model to allow the model to continue to be refined.

The machine learning model for business impact enrichment is trained as follows. As above, and in all examples of training, a corpus of sources (e.g., sources or supplementary sources) are provided to or received by the machine learning server (using, for example, the database). The corpus includes documents which each include components (e.g., sentences and sentence fragments). In some examples, each component is classified using classifier algorithms into classes, types, and entities. The corpus may also be classified based on relationship to business impacts including, for example, supply chain risk, environmental impact, competitive risks, and pricing risks. As such, the corpus may be processed using language processing algorithms to identify documents or texts containing references to business impacts or similar information. The machine learning server decomposes each item of the corpus including decomposition into segments related to any identified business impacts. The machine learning server performs training cycles wherein a user provides a business impact training input related to a training scenario involving business impact. (Each identified and decomposed part of the sources and input may be further classified using the classifiers described, and including classification by business impact.) The business impact training input is used to define a business impact scenario profile. In many examples, the business impact training input is decomposed into parts based on any related issues. The machine learning server provides at least one component of the corpus, as business impact content, to a user to determine whether the at least one component relates to the business impact training scenario. (In most examples, the machine learning server also applies the classifier to the business impact training input and identifies the at least one component based on overlapping classification between the at least one component and the business impact training scenario.) In most examples, the component of the corpus selected includes information related to the fact that the business impact training input and business impact scenario profile relate to business impacts such as those described herein. The machine learning server receives a training business impact response indicating whether the selection (the component) of the business impact content relates to the training scenario. The training business impact response is used to train the machine learning model for business impact. In operation, when the machine learning server applies the business impact enrichment machine learning model, the machine learning server may continue to re-train the model based on further feedback. As such, a user may provide training business impact responses in response to a trained business impact enrichment machine learning model to allow the model to continue to be refined. Business impacts that may be addressed using the business impact enrichment machine learning model include appending content related to environmental impact (e.g., footprint calculations and waste), externalities, and exposure to risks in supply chains.

In further examples, the machine learning server defines and uses a trend prediction algorithm to supplement the functions provided. In the example embodiment, the machine learning server receives a corpus of source information. Generally, each item of the corpus is associated with a time period such as a date or a time. The machine learning server further parses each item of the corpus of source information to identify sentence fragments (or other component elements) along with an associated time period. The machine learning server further submits sentence fragments (or other component elements) to an attention-based transformer trained on a relevant corpus or multiple corpus, to predict associated relevant content such as sentence fragments. In many examples, the transformer functions in real-time or near real-time. The machine learning server additionally identifies a context associated with each of the sentence fragments (or other component elements). The machine learning server also applies a sentiment analysis algorithm to determine whether the content of the sentence fragments (or component elements) is being discussed in a positive or in a negative manner. Thus, for each item of the corpus of source material (including primary and supplementary sources, as described herein), the machine learning server obtains: (a) component element content (e.g., strings of text, pages of text, or portions of audio or video); (b) a related time period; (c) a related context, and (d) a related sentiment. The machine learning server processes these elements together to determine trends that specify how particular phrases, terms, words, names, or other content become (a) more popular; (b) less popular; (c) well-known; and/or (d) less referenced in contexts. The machine learning server then defines a model for the trend prediction algorithm to provide relevant content in conjunction with the hypotheses, targets, scenarios, and other content described herein that is provided directly or through enrichment by the machine learning server. In one embodiment, the machine learning server trains the trend prediction algorithm using a machine learning model. In this approach, the machine learning server receives training inputs, decomposes and classifies the training inputs, identifies trend content based on the context of the training input, provides the trend content to a user, receives a user response indicating whether the trend content was relevant or not (whether by score, ranking, or a binary yes/no), and trains a machine learning model based on such input. In operation, when the machine learning server applies the trend machine learning model, the machine learning server may continue to re-train the trend machine learning model based on further feedback. As such, a user may provide further trend responses in response to a trained trend machine learning model to allow the model to continue to be refined.

For each of the machine learning models described herein, the machine learning server iterates repeatedly to improve the predictive quality. In some examples, for each of the machine learning models, entities, classes, and types are organized within a hierarchy such that distinct entities may be related (or "nearer") to one another, as are distinct classes, and distinct types. In such examples, the machine learning server may provide content to a user via the machine learning models (whether in training or in operation) for "adjacent" entities within a particular entity within a class or classes within a type. In a similar manner, the machine learning model for component enrichment may organize parts and wholes and provide content to a user based on a related or adjacent part or whole that may not be present in the scenario input.

The machine learning server also includes a target machine learning model used to identify targets in response to a scenario. The machine learning server receives a corpus and decomposes each item of the corpus in underlying fragments. In the example embodiment, the machine learning server identifies elements with candidate metrics from the corpus including content that describes a particular thing, process, compound, technology, field, issue, or topic in conjunction with a particular metric. The metric may include any discernible measurement including numerical measures, currency amounts, percentages, ratings, or any other measurement. The machine learning server also classifies each component of the corpus and each decomposed portion of the corpus using the classification approaches described above. The machine learning server also identifies a context for each item of the corpus and each fragment of the corpus. Thus, the machine learning server obtains a pool of classified targets, each associated with a context. The machine learning server receives a training input for a scenario to train target prediction, decomposes and classifies the training input. The machine learning server also identifies at least one responsive target with a context and classification corresponding to or related to the context and classification of the training input. The machine learning server provides at least one responsive target to a user, and receives a user response indicating whether the responsive target relevant to the scenario or not (whether by score, ranking, or a binary yes/no). The machine learning server trains the target machine learning model based on such user response. In operation, when the machine learning server applies the target machine learning model, the machine learning server may continue to re-train the model based on further feedback. As such, a user may provide responses in response to a trained target machine learning model to allow the model to continue to be refined.

The machine learning server also includes a hypothesis machine learning model used to identify candidate innovations in response to a scenario and in response to targets. The machine learning server receives a corpus and decomposes each item of the corpus in underlying fragments. In the example embodiment, the machine learning server identifies elements with candidate innovations from the corpus including content that describes a particular thing, process, compound, technology, field, issue, or topic in conjunction with a particular innovative concept. The innovation may include any improvement in an analogous or related field, any hypothesized or predicted improvement, scientific data and/or analysis indicating a new possible opportunity for design or development, business data and/or analysis indicating a new possible opportunity for design or development, or similar information. The machine learning server also classifies each component of the corpus and each decomposed portion of the corpus using the classification approaches described above. The machine learning server also identifies a context for each item of the corpus and each fragment of the corpus. As described above, the machine learning server may associate targets from the pool of targets with classifications and contexts. The machine learning server applies the target machine learning model to identify targets relevant to each hypothesis, based on related or corresponding context and classification. Thus, the machine learning server obtains a pool of classified hypotheses, each associated with a context and at least one target. The machine learning server receives a training input for a scenario and target to train hypothesis prediction, and decomposes and classifies the training input. The machine learning server also identifies at least one responsive hypothesis with a context and classification corresponding to or related to the context and classification of the training input. The machine learning server provides at least one responsive hypothesis to a user, and receives a user response indicating whether the responsive hypothesis relevant to the scenario and target, or not (whether by score, ranking, or a binary yes/no). The machine learning server trains the hypothesis machine learning model based on such user response. In operation, when the machine learning server applies the hypothesis machine learning model, the machine learning server may continue to re-train the model based on further feedback. As such, a user may provide responses in response to a trained hypothesis machine learning model to allow the model to continue to be refined.

In operation the machine learning models described aggregate the learning derived and continually iterate to improve their learning. In one example, a multi-dimensional matrix is maintained for each machine learning model, whereby matches that occur (i.e., wherein a user selects a particular output as relevant) are weighted (based in part on any relevancy score or rating). The multi-dimensional matrix forms vectors for each match and generates a score for each component of a corpus across relevant scenarios, targets, and other objects.

The machine learning server applies the machine learning models described to perform the functions described herein.

In some examples, the machine learning models may be defined specific to a domain or a group of domains of information. In such examples, the machine learning models may be trained to provide specific functionality within a context, and to predict targets and hypotheses for scenarios specific to the context of that domain.

In one aspect, the systems described may be referred to as providing a "human-in-the-loop" method of machine learning because the machine learning models continually learn from human intelligence and use matches to accelerate the learning of the system. However, the underlying architecture of each machine learning model depends upon relationships derived based on classification data, context data, language processing, and object relationships, as described herein.

Below are examples of output provided by the machine learning server applying the methods described. In a first example, a user provides the input, "battery materials are toxic" to define a scenario. The machine learning server applies at least the content enrichment machine learning model, parses the statement to identify the terms "battery", "materials", and "toxic", and identifies the classification and context for each and obtains new content to append and revise the statement. In some examples, the machine learning server submits the text to a transformer based on attention-based mechanisms, before appending and revising the statement. The input is appended and revised to state: "Batteries use toxic materials, are difficult or inconvenient to recharge and/or recycle, and have limited electrical capacity. They are in more and more demand, however. Portable devices, and small electronic units are multiplying. More people use their devices on the go, and need convenient portable power that they can easily swap and replace."

In some examples, the machine learning server and machine learning expert system may apply custom algorithms and metrics specific to a domain. In one example related to environmental impact, an algorithm for volumetric mass and energy may be determined. The system receives its data input required for assessing the material and energy usage of a given process by means of user input, or derivation from the text by a system of number annotation. The resulting mathematical information is extracted (number, ordinal, cardinal, units) and used to calculate. The calculation is completed. Similar volumetric mass and energy values from other domains are correlated, and the volumetric mass/energy optimization is made clear.

Generally, the systems and methods described herein are configured to perform at least the following steps: receiving a user input related to a scenario; defining a scenario profile based on the user input; applying a first trained machine learning model to the scenario profile to generate at least one target associated with the scenario, wherein the at least one target includes a measurable desired outcome; prompting for a user selection from the at least one target; applying a second trained machine learning model to the scenario profile and the user selection from the at least one target to generate at least one candidate innovation predicted to achieve the achieve the measureable desired outcome; obtaining descriptive information related to the at least one candidate innovation; presenting the descriptive information related to the at least one candidate innovation to a user; obtaining a pool of targets; receiving a training user input related to a training scenario; defining a training scenario profile based on the training user input; applying a first machine learning algorithm to the scenario to identify a selection of the pool of targets predicted to be responsive to the training scenario profile based on semantic correlation or attention-mechanism based transformation; receiving a target training response indicating whether the selection of the pool of targets relates to the training scenario profile; training a first machine learning model as the first trained machine learning model based on the target training response defining relationships between the training response and the training scenario; obtaining a pool of hypotheses; receiving a training user input related to a training scenario and a training target; defining a training hypothesis model based on the training user input; applying a second machine learning algorithm to the scenario to identify a selection of the pool of hypotheses predicted to be responsive to the training scenario and the training target, based on semantic correlation or attention-mechanism based transformation; receiving a hypothesis training response indicating whether the selection of the pool of hypotheses relates to the training scenario and the training target; training a second machine learning model as the second first trained machine learning model based on the hypothesis training response defining relationships between the hypothesis training response, the training scenario, and the training target; receiving the user input related to a scenario; identifying a statement type associated with the user input; applying a third trained machine learning model to the user input to identify a set of enrichment content associated with the scenario and the statement type; appending the user input with the set of enrichment content; defining the scenario profile based on the appended user input; obtaining a set of training enrichment content; receiving a training user input related to a training scenario; applying a third machine learning algorithm to the training scenario to identify a selection of the set of training enrichment content predicted to be responsive to the training scenario, based on application of a natural language processing algorithm; receiving an enrichment training response indicating whether the selection of the set of training enrichment content relates to the training scenario; training a third machine learning model as the second first trained machine learning model based on the enrichment training response defining relationships between the enrichment training response and the training scenario; applying the second trained machine learning model and a trend prediction algorithm to the scenario profile and the user selection from the at least one target to generate the at least one candidate innovation predicted to achieve the achieve the measureable desired outcome, wherein the at least one candidate innovation is related to a trend predicted by the trend prediction algorithm; receiving a corpus of source information, wherein each of the corpus is associated with a time period; parsing each of the corpus of source information to identify a plurality of sentence fragments and the associated time period; identifying a context associate with each of the sentence fragments; applying a sentiment analysis algorithm to determine a related sentiment associated with each of the sentence fragment; defining a model for the trend prediction algorithm based on the sentiment and time period associated with each of the sentence fragments, wherein the model describes trend in opinion of the sentence fragment for each context over time; receiving the user input related to a scenario; applying a fourth trained machine learning model to the user input to identify a set of parts associated with the scenario; defining the scenario profile based at least partially on the set of parts.

FIG. 1 is a functional block diagram of an example computing device that may be used in the machine learning expert system described, and may represent the machine learning server, the source database, and any other systems described herein (all shown in FIGS. 2-5). Specifically, computing device 10 illustrates an exemplary configuration of a computing device for the systems shown herein, and particularly in FIGS. 2-5. Computing device 10 illustrates an exemplary configuration of a computing device operated by a user 5 in accordance with one embodiment of the present invention. Computing device 10 may include, but is not limited to, the machine learning server, the database, and any other systems described herein (all shown in FIGS. 2-5), other user systems, and other server systems. Computing device 10 may also include servers, desktops, laptops, mobile computing devices, stationary computing devices, computing peripheral devices, smart phones, wearable computing devices, medical computing devices, and vehicular computing devices. Alternatively, computing device 10 may be any computing device capable of the described methods for machine learning and for predicting innovations that will achieve one or more target goals in a scenario. In some variations, the characteristics of the described components may be more or less advanced, primitive, or non-functional.

In the exemplary embodiment, computing device 10 includes a processor 11 for executing instructions. In some embodiments, executable instructions are stored in a memory area 12. Processor 11 may include one or more processing units, for example, a multi-core configuration. Memory area 12 is any device allowing information such as executable instructions and/or written works to be stored and received. Memory area 12 may include one or more computer readable media.

Computing device 10 also includes at least one input/output component 13 for receiving information from and providing information to user 5. In some examples, input/output component 13 may be of limited functionality or non-functional as in the case of some wearable computing devices. In other examples, input/output component 13 is any component capable of conveying information to or receiving information from user 5. In some embodiments, input/output component 13 includes an output adapter such as a video adapter and/or an audio adapter. Input/output component 13 may alternatively include an output device such as a display device, a liquid crystal display (LCD), organic light emitting diode (OLED) display, or "electronic ink" display, or an audio output device, a speaker or headphones. Input/output component 13 may also include any devices, modules, or structures for receiving input from user 5. Input/output component 13 may therefore include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output and input device of input/output component 13. Input/output component 13 may further include multiple sub-components for carrying out input and output functions.

Computing device 10 may also include a communications interface 14, which may be communicatively coupleable to a remote device such as a remote computing device, a remote server, or any other suitable system. Communication interface 14 may include, for example, a wired or wireless network adapter or a wireless data transceiver for use with a mobile phone network, Global System for Mobile communications (GSM), 3G, 4G, or other mobile data network or Worldwide Interoperability for Microwave Access (WIMAX). Communications interface 14 is configured to allow computing device 10 to interface with any other computing device or network using an appropriate wireless or wired communications protocol such as, without limitation, BLUETOOTH®, Ethernet, or IEE 802.11. Communications interface 14 allows computing device 10 to communicate with any other computing devices with which it is in communication or connection.

Figure 2:
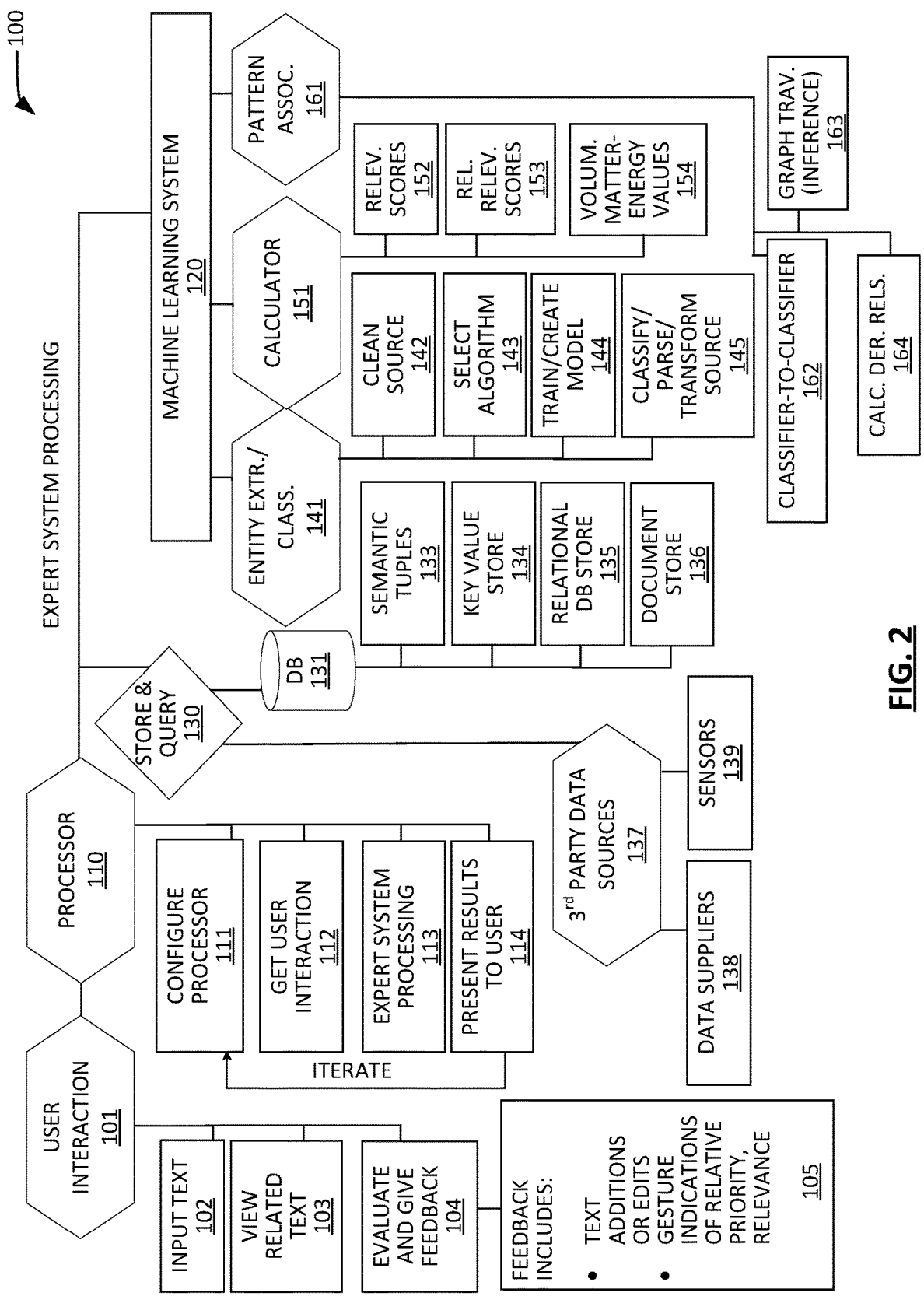
FIG. 2 is a functional block diagram of a first illustration of an expert machine learning system that may be deployed using the computing devices shown in FIG. 1.

FIGS. 2-5 illustrate block diagrams of the machine learning expert system according to four embodiments. Referring to FIG. 2, a first illustration of the machine learning expert system 100 is provided. The systems described in machine learning expert systems in FIGS. 2-5 may include the features of computing device 10 (shown in FIG. 1) although not all parallel features are shown due to brevity. The machine learning expert system 100 includes a user interaction component 101, a processor component 110, a store and query component 130, and a machine learning component 120. In some embodiments, store and query component 130 is performed using a memory like memory 12 (shown in FIG. 1). User interaction component 101 is configured to provide interaction with a user such as user 5 via an input/output such as input/output component 13 (both shown in FIG. 1). User interaction component 101 includes a component to receive input text 102, a component to allow a user to view text 103, a component to evaluate and give feedback 104, and a component to receive enhanced feedback 105 such as text additions, edits, gestures, or rankings. Processor component 110 is configured with configuration component 111, receives user interaction with interaction component 112, applies expert system processing with component 113, and presents results to a user with component 114. In examples described processor repeatedly iterates through the use of components 111-114. Store and query component 130 includes a database 131 and $3^{rd}$ party data sources 137. Database 131 includes semantic tuples store 133, key value store 134, relational database store 135, and document store 136. $3^{rd}$ party data sources 137 include data suppliers 138 and sensors 139.

Machine learning component 120 includes components used to create, define, train, update, and apply the machine learning models described herein, including an entity extraction and classification component 141, a calculator component 151, and a pattern associating component 161. Entity extraction and classification component 141 includes a clean source component 142, an algorithm selection component 143, a model creation and training component 144, and a classification, parsing, and transforming component 145. Calculator component 151 includes components used to perform the computations described herein including relevance scores 152, relative relevance scores 153, and domain specific values such as volumetric matter-energy values 154. Calculator 151 also is configured to compute the multi-dimensional matrix used to define and update some machine learning models.

Pattern association component 161 includes a classifier-to-classifier component 162, a graph traversal component 163, and calculation derived relationship component 164.

Figure 3:
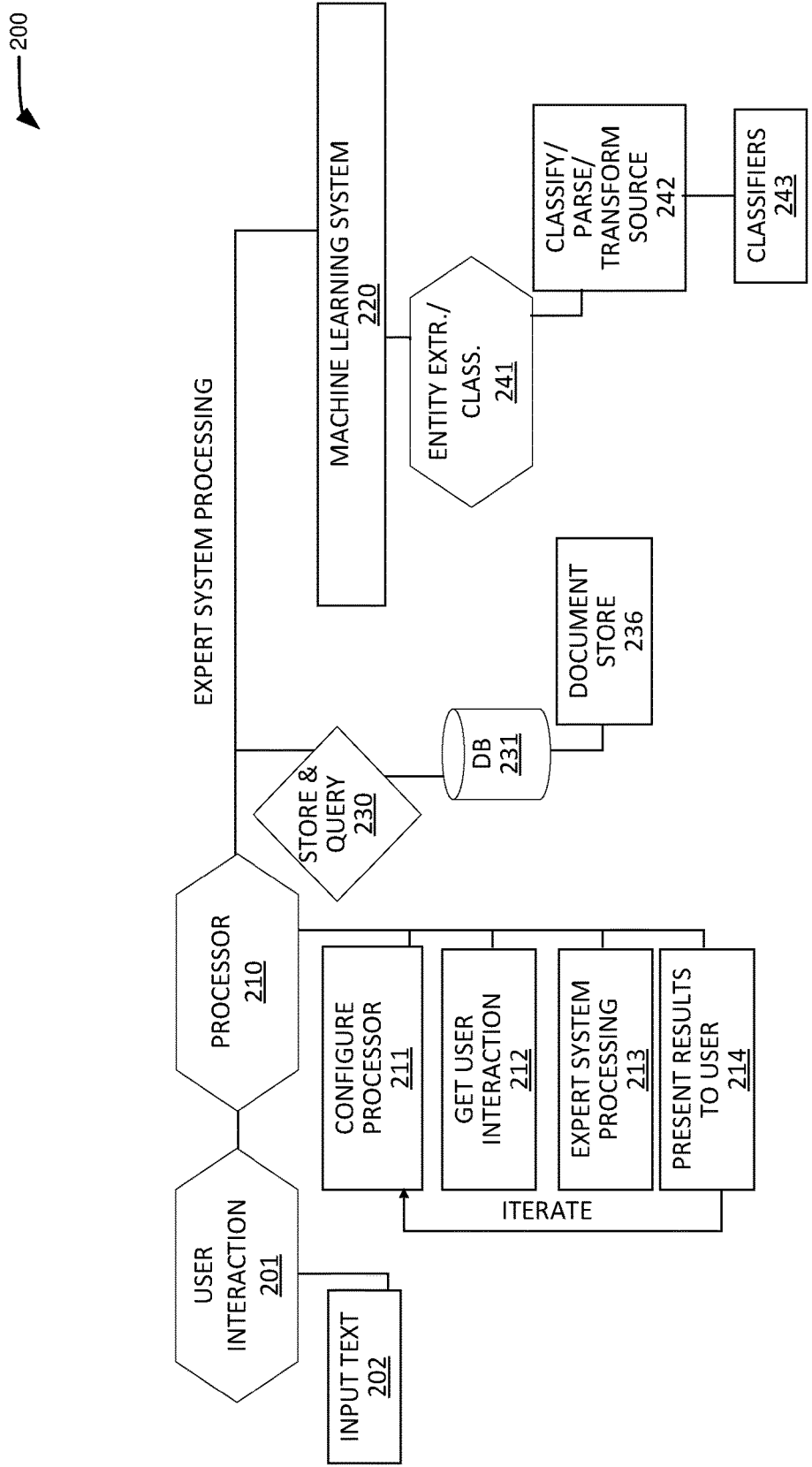
FIG. 3 is a functional block diagram of a second illustration of an expert machine learning system that may be deployed using the computing devices shown in FIG. 1.
Figure 4:
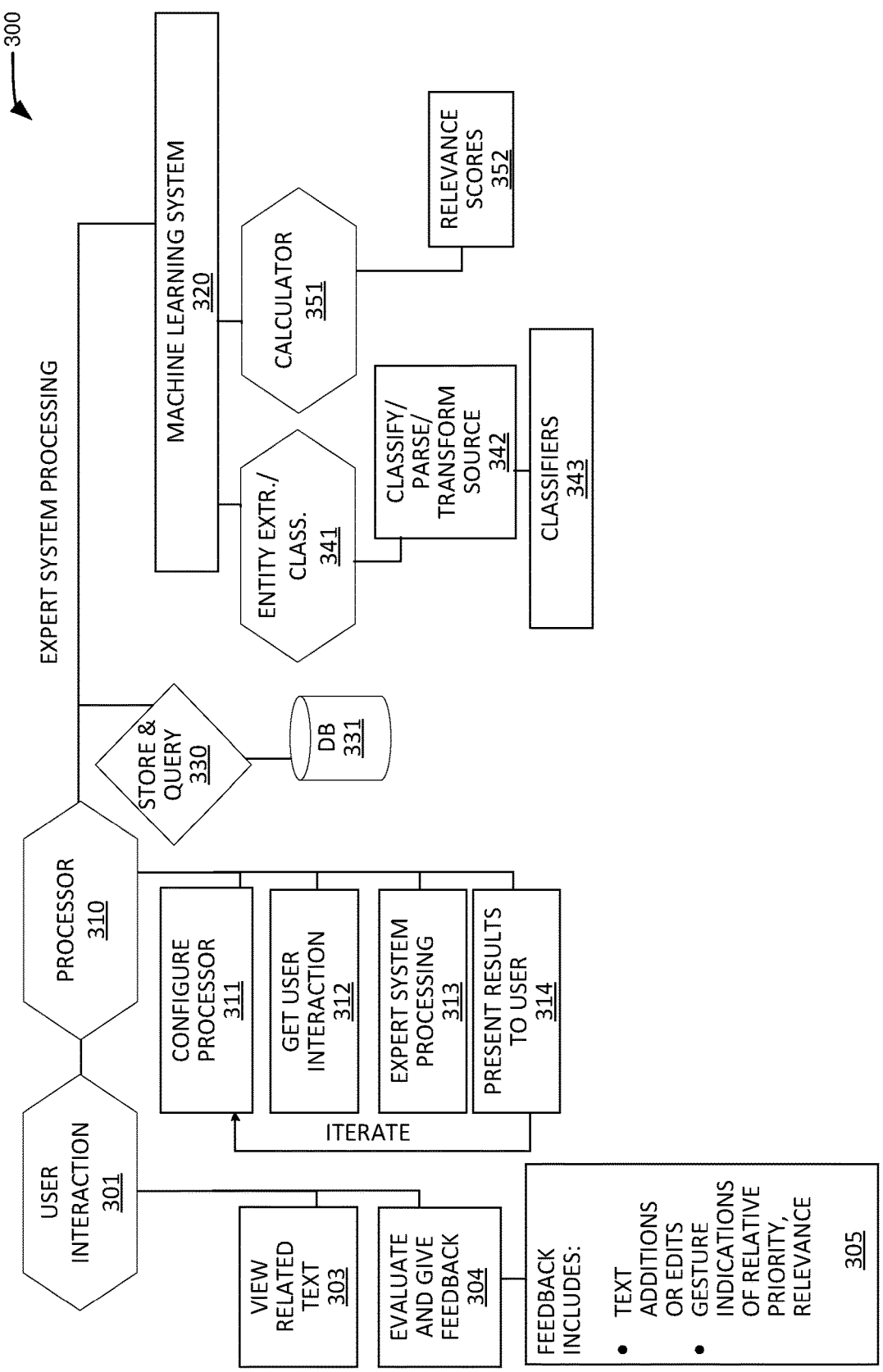
FIG. 4 is a functional block diagram of a third illustration of an expert machine learning system that may be deployed using the computing devices shown in FIG. 1.
Figure 5:
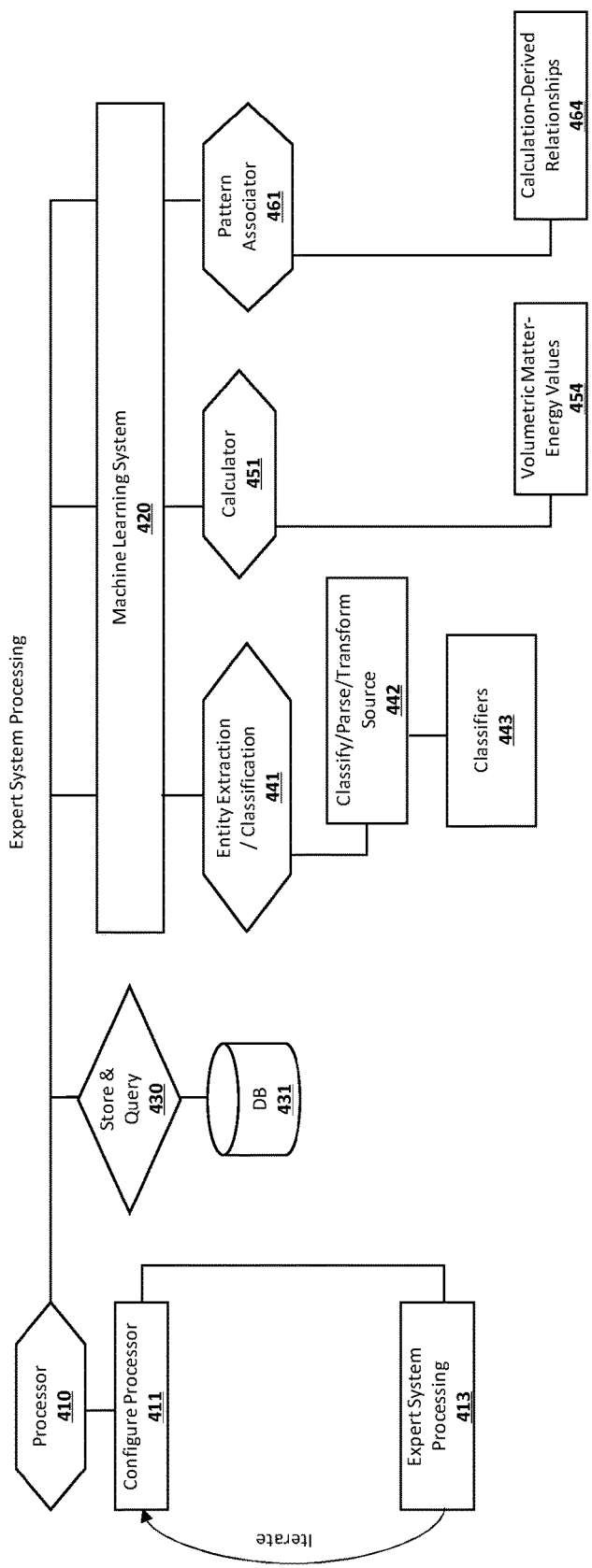
FIG. 5 is a functional block diagram of a fourth illustration of an expert machine learning system that may be deployed using the computing devices shown in FIG. 1.

Referring to FIGS. 3-5, alternative versions of the expert machine learning system illustrated in FIG. 2 are provided that may be deployed using the computing device shown in FIG. 1. The expert machine learning systems 200, 300, and 400, provide functionality similar to that described in expert machine learning system 100 (shown in FIG. 2), using subsets of the components described therein.

Figure 6:
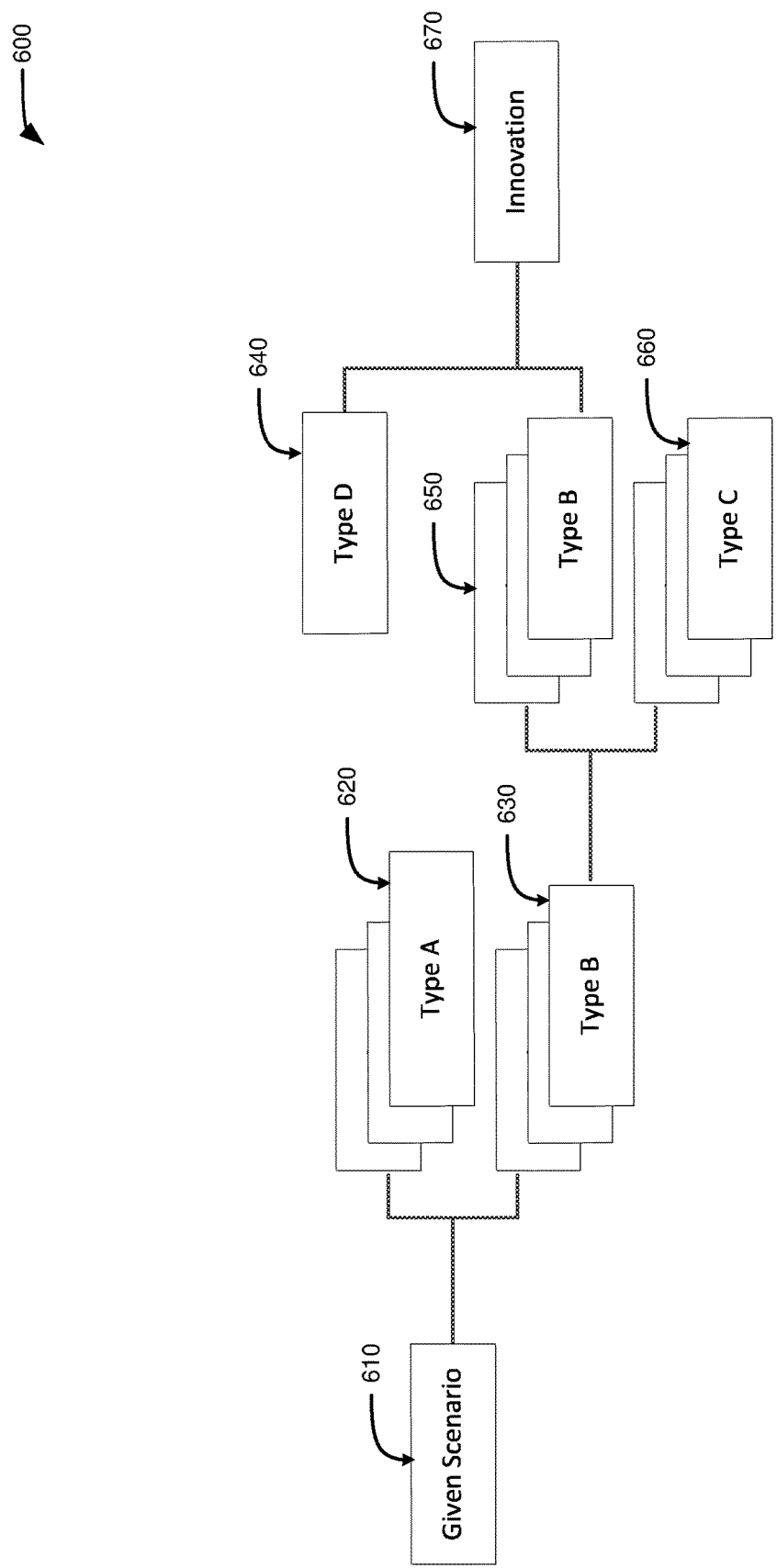
FIG. 6 is a conceptual block diagram illustrating a first example classification approach provided by the machine learning server of FIGS. 2-5.

FIG. 6 is a conceptual block diagram 600 illustrating a first example classification approach provided by the machine learning server of FIGS. 2-5. In diagram 600, a given scenario 610 and an innovation 670 classified in relation to classifying entities 620, 630, 640, 650, and 660. As indicated, scenario 610 is classified within both type A 620 and type B 630 while innovation 670 is classified in type D 650 and type B 650. (Note that types B 630 and 650 correspond to the same classification but are depicted separately for clarity with regard to their relationships to scenario 610 and innovation 670.) Thus, scenario 610 is classified with entities 620, 630, 640, 650, and 660. Since entities 620, 630, 640, 650, and 660 are parts (or components) of classes and types, semantic graph queries can "walk the graph" via a hypothesis and find an innovation 680. The distance walked is weighted and scored, and stored in an aggregator. At the conclusion of running several hypotheses, the highest scoring innovations are returned as recommendations.

Figure 7:
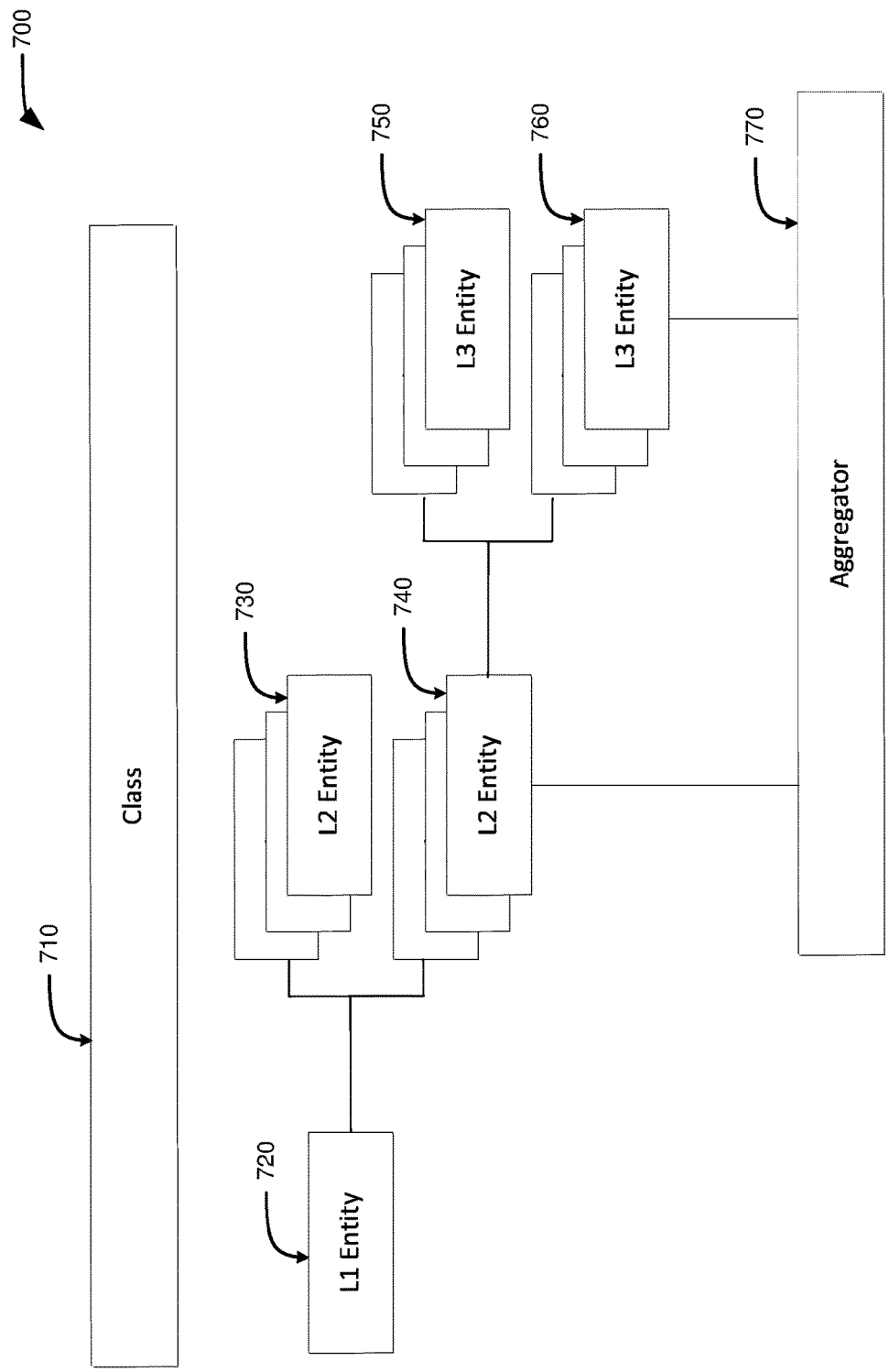
FIG. 7 is a conceptual block diagram illustrating a second example classification approach provided by the machine learning server of FIGS. 2-5.

FIG. 7 is a conceptual block diagram 700 illustrating a second example classification approach provided by the machine learning server of FIGS. 2-5. In diagram 700, a class 710 is shown with hierarchical entities 720, 730, 740, 750, and 760. The level 1 entities 720 is associated hierarchically with multiple level 2 entities 730 and 740, which each have sub-entities. The level 2 entities 730 and 740 are associated with multiple level 3 entities 750 and 760. All entities 720, 730, 740, 750, and 760 are visible to the aggregator 770, which can accumulate weights and scores.

Figure 8:
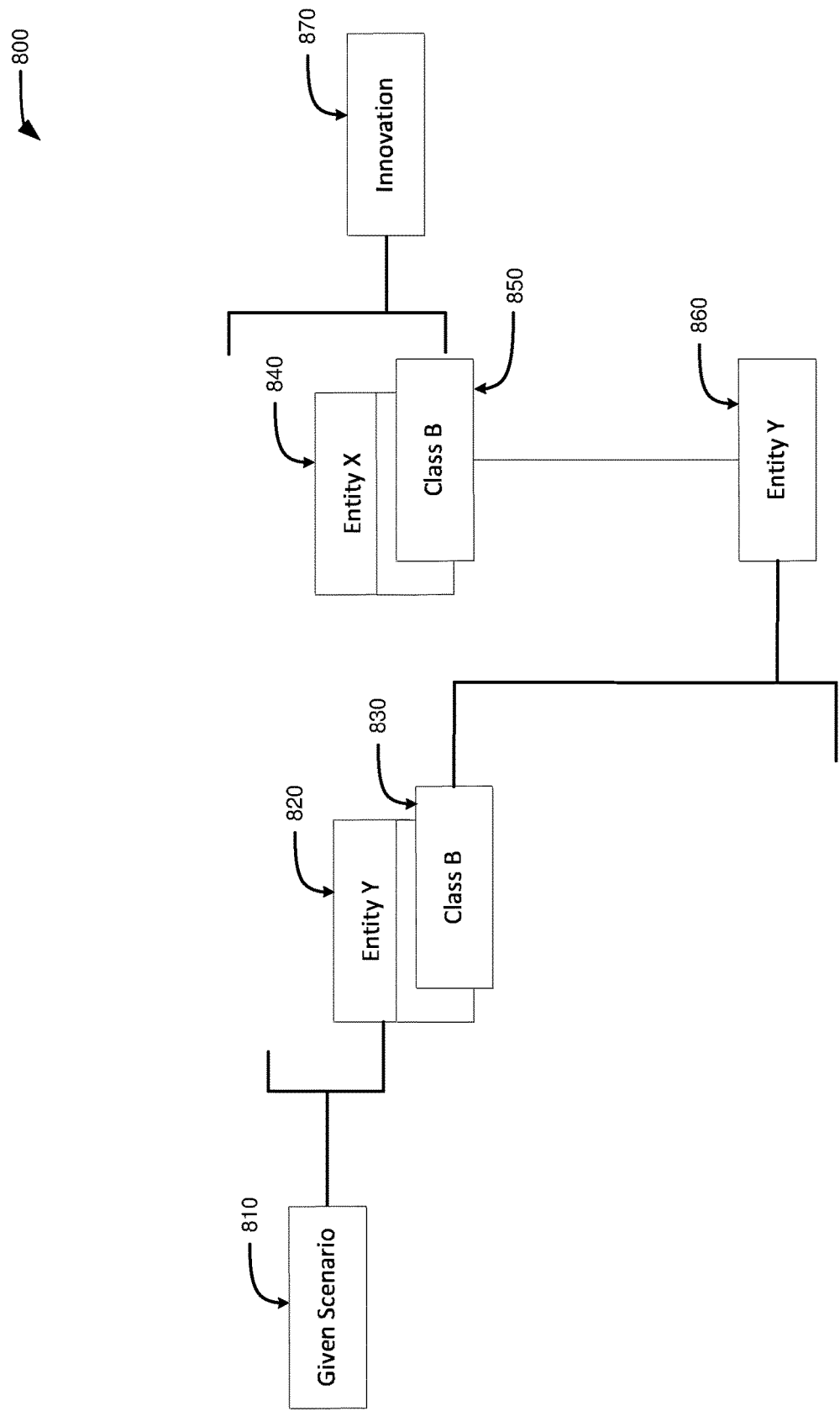
FIG. 8 is a conceptual block diagram illustrating a third example classification approach provided by the machine learning server of FIGS. 2-5.

FIG. 8 is a conceptual block diagram 800 illustrating a third example classification approach provided by the machine learning server of FIGS. 2-5. Diagram 800 provides a closer view of walking the graph via a hypothesis. The hypothesis indicated is that related entities 820 of class B 830 will return relevant innovations for scenario 810. Entity Y 820 is classified to the scenario 810. Since it is in class B 830, and the hypothesis states that class B 830 related entities will return relevant innovations, entity X 840 of class B 850 (which corresponds to class B 830 as entity Y 820 and 860 correspond) is queried and returns the innovation 870. The innovation 870 is passed to the aggregator with the relevant hypothesis name, which accumulate weights and updates scores.

Figure 9:
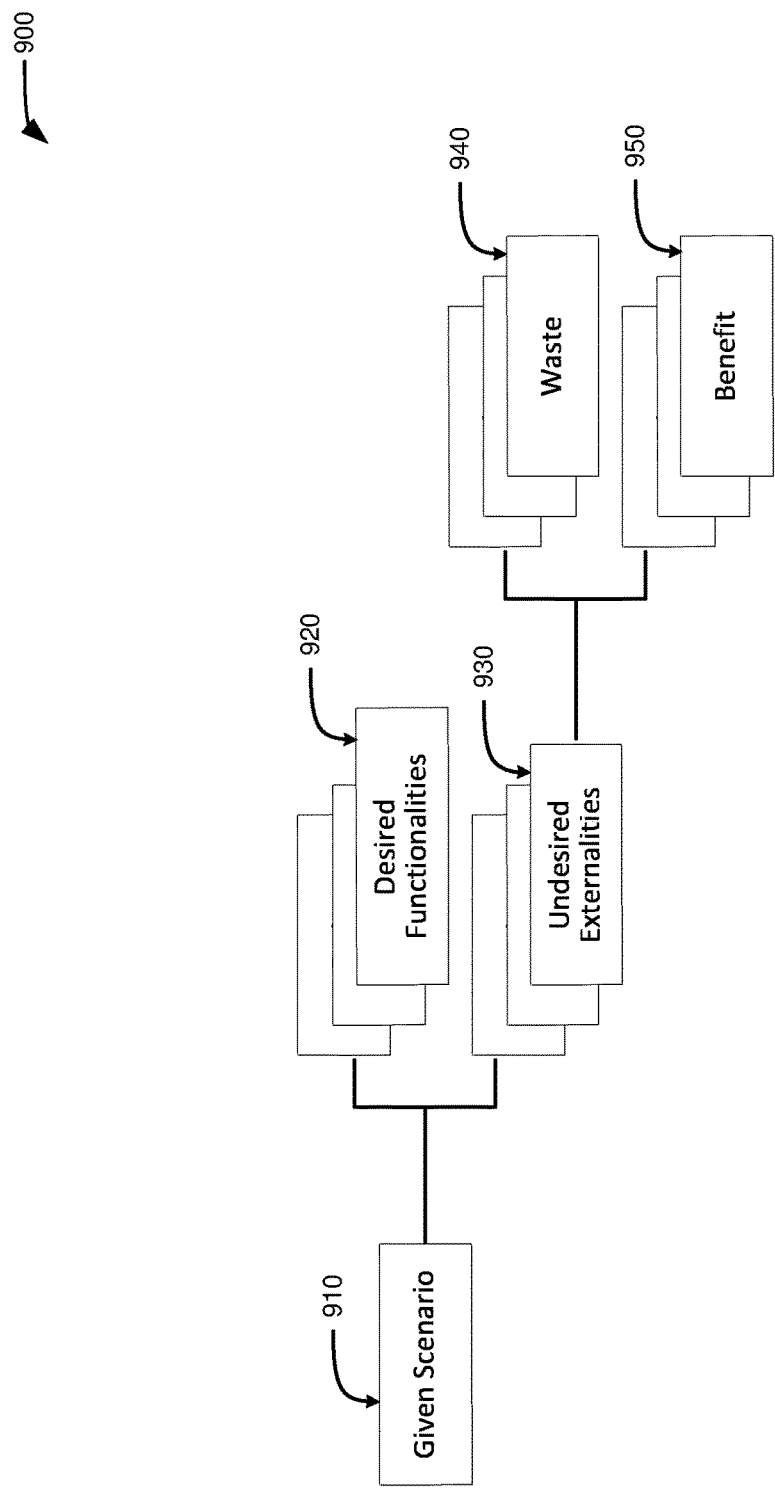
FIG. 9 is a conceptual block diagram illustrating a fourth example classification approach provided by the machine learning server of FIGS. 2-5.

FIG. 9 is a conceptual block diagram 900 illustrating a fourth example classification approach provided by the machine learning server of FIGS. 2-5. Diagram 900 provides a resource processing view. The scenario 910 is processed for resources, classified by resource risk classes into desired functionalities 920 and undesired functionalities 930 which may correspond to target state and risk target state respectively. These are then graph-queried to discover where a given resource is associated with waste 940 or benefit 950.

Figure 10:
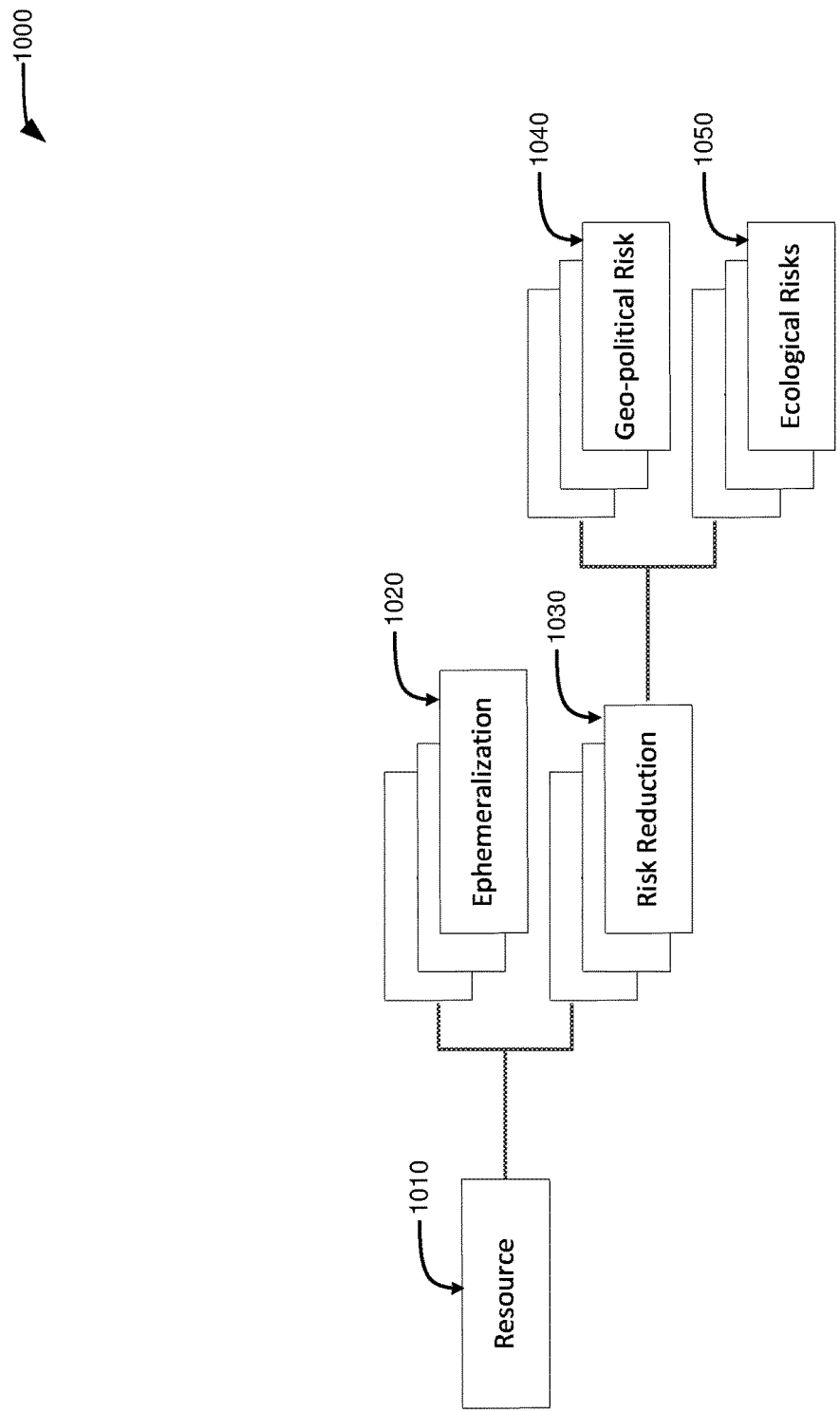
FIG. 10 is a conceptual block diagram illustrating a fifth example classification approach provided by the machine learning server of FIGS. 2-5.

FIG. 10 is a conceptual block diagram 1000 illustrating a fifth example classification approach provided by the machine learning server of FIGS. 2-5. The resource type 1010 includes classes of ephemeralization 1020 and risk reduction 1030, which in turn are associated with entities of geo-Political risk 1040 and ecological risk 1050. By traversing the semantic relationships, the process can link each resource in a part/whole relationship with risks and by inverse, targets.

Figure 11:
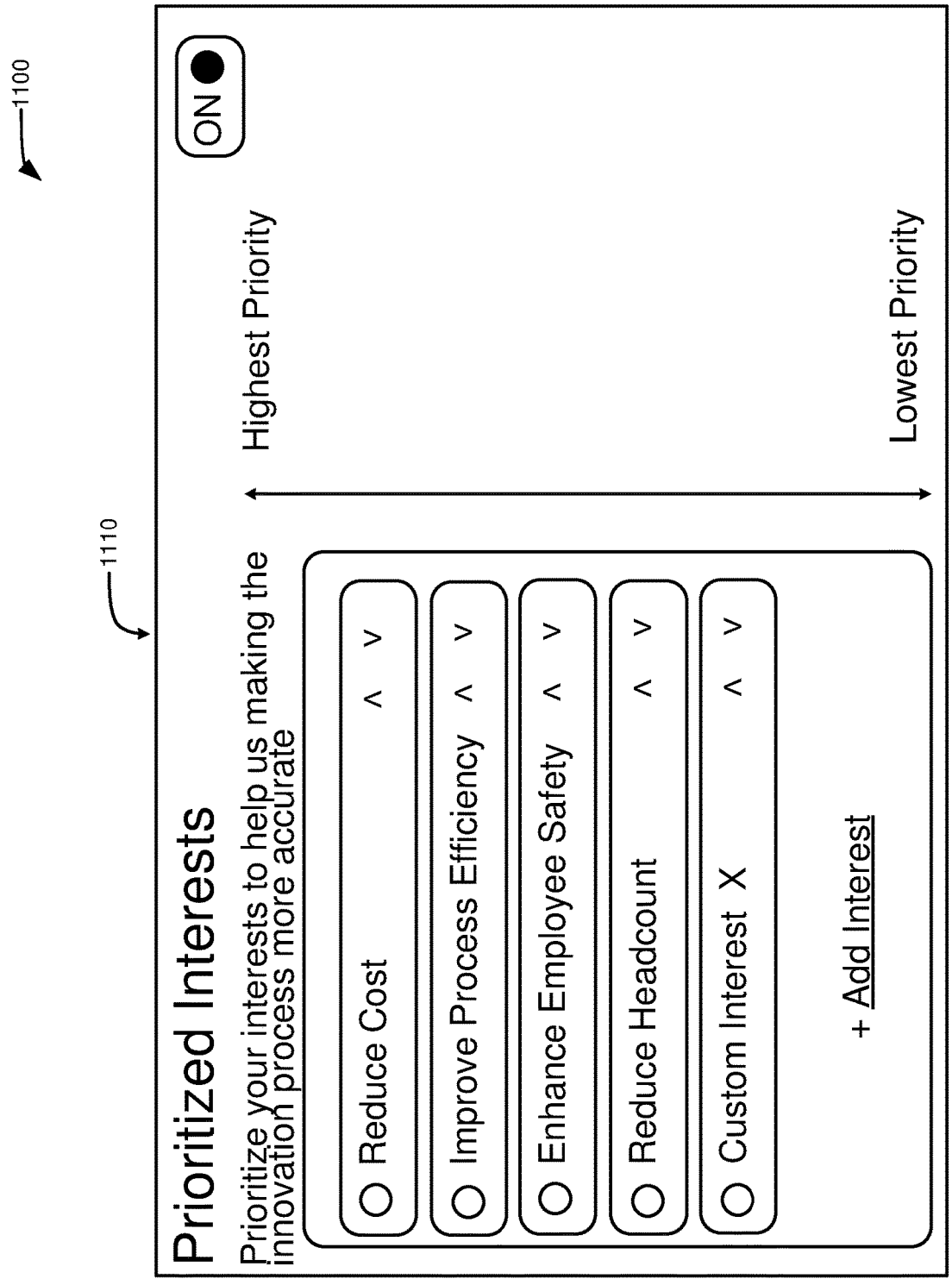
FIG. 11 is an example user interface for configuring aspects of the methods described provided by the machine learning server of FIGS. 2-5.

FIG. 11 is an example user interface 1100 for configuring aspects of the methods described provided by the machine learning server of FIGS. 2-5. In interface 1100, a user may prioritize interests to allow human preference to influence machine learning.

Figure 12:
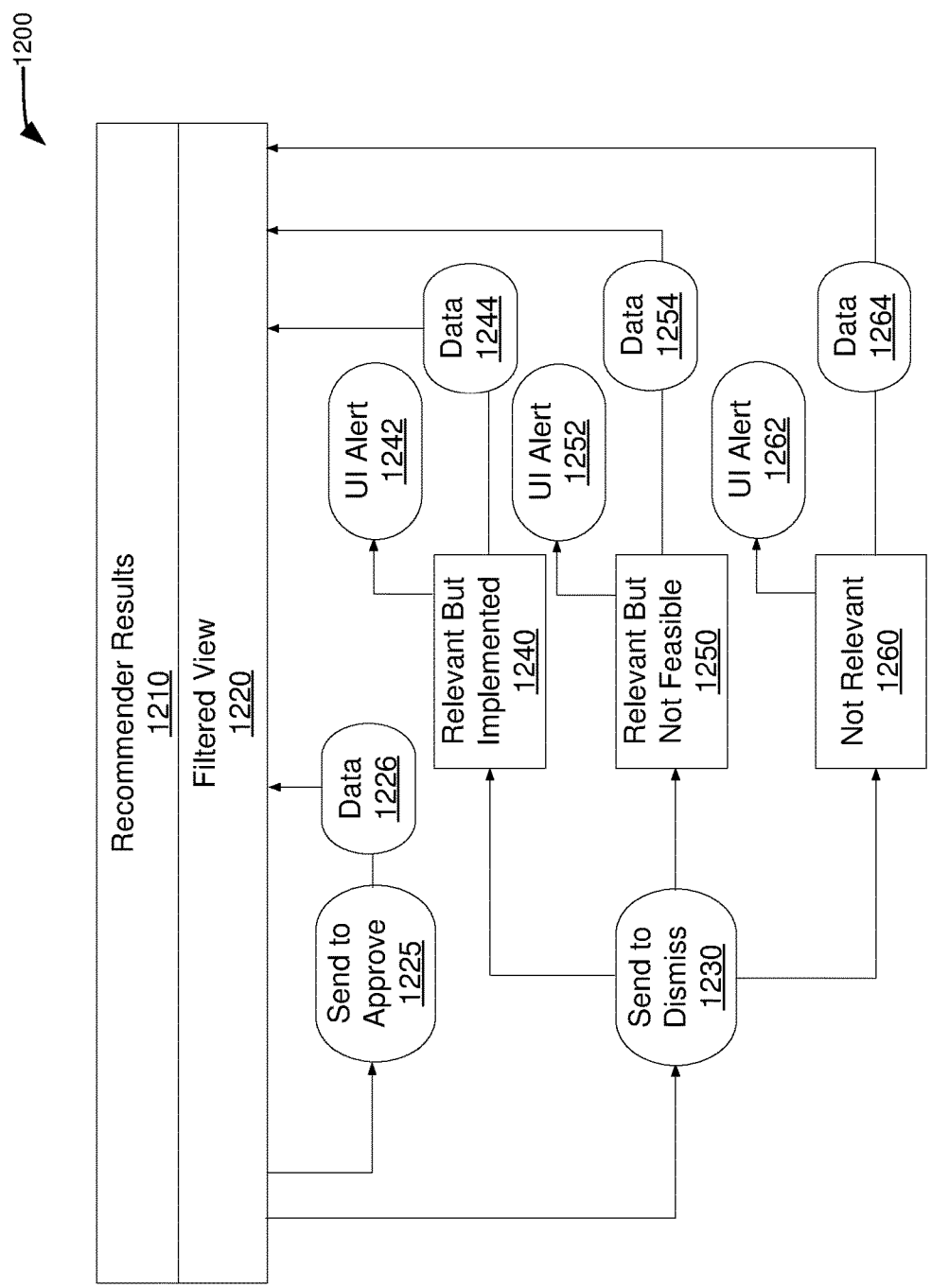
FIG. 12 is an example flowchart of a feedback mechanism provided by the machine learning models described herein in the machine learning server of FIGS. 2-5.

FIG. 12 is an example flowchart 1200 of a feedback mechanism provided by the machine learning models described herein in the machine learning server of FIGS. 2-5. The feedback mechanism allows input of humans using the expert machine learning system to influence the prediction of candidate innovations and targets. The feedback mechanism (like the machine learning models described herein) allows the machine learning system to achieve subject matter expertise in the human re-enforced learning results. Specifically, the machine learning system obtains results from recommender results 1210 which are processed through a filtered view 1220 and sent to review. A user may receive results 1210 and determine whether they are relevant or not, partially relevant, or relevant but implemented already or relevant but unfeasible. As such, user may indicate approval with selection 1225 and send data 1226 back to the machine learning system to train that the results were relevant. User may also indicate disapproval with selection dismissal 1230 and further indicate the reasons as being relevant but implemented 1240, relevant but not feasible 1250, and not relevant 1260. When the user selects such reasons 1240, 1250, 1260, the user may trigger an alert 1242, 1252, and 1262 and transmit training data 1244, 1254, and 1264 to the machine learning system.

Figure 13:
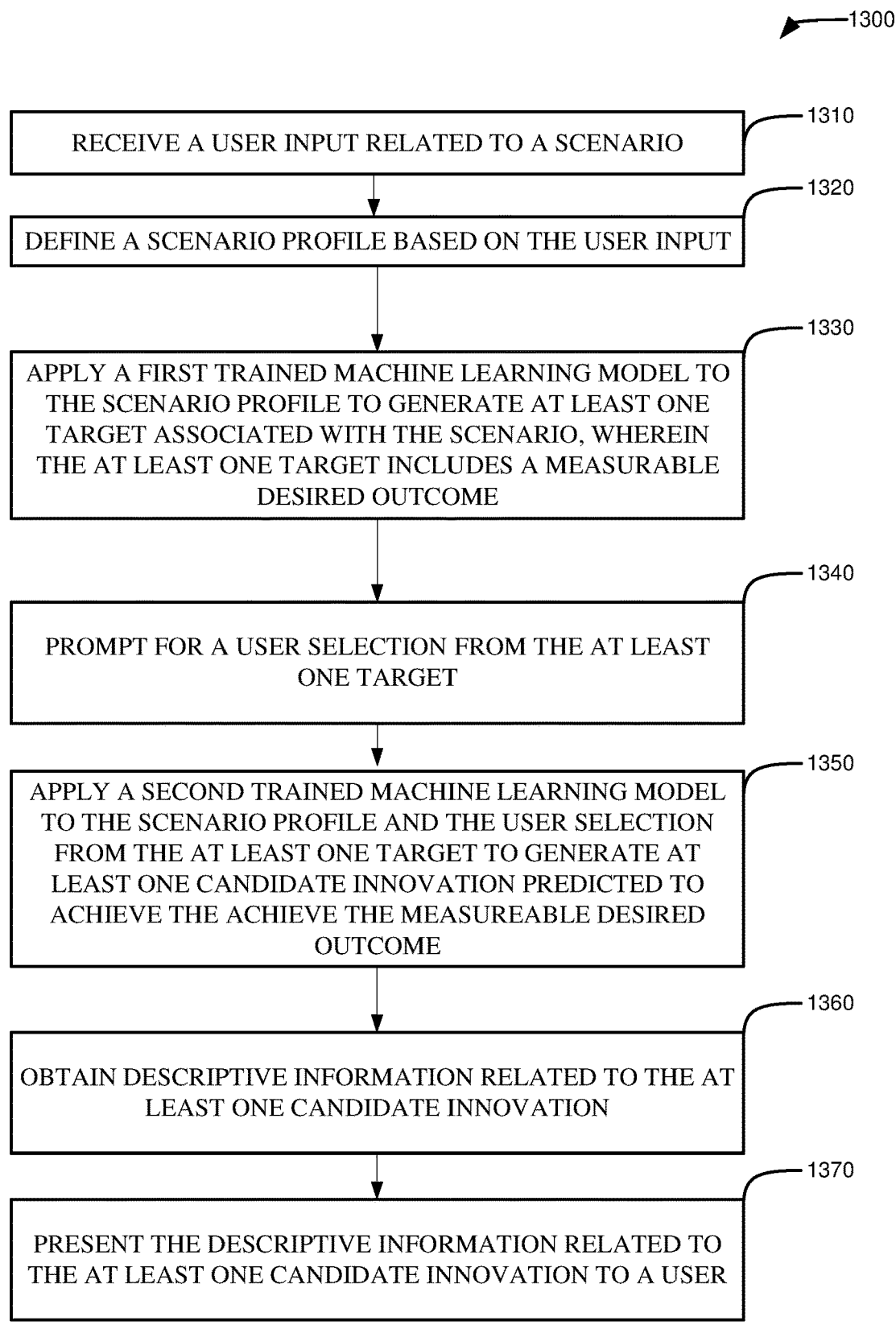
FIG. 13 is an example method for prediction and recommendation of innovative solutions to targeted problems for scenarios performed by the machine learning server of FIGS. 2-5.

FIG. 13 is an example method 1300 for prediction and recommendation of innovative solutions to targetted problems for scenarios performed by the machine learning server of FIGS. 2-5. The method is performed by the machine learning server and includes receiving 1310 a user input related to a scenario, defining 1320 a scenario profile based on the user input, applying 1330 a first trained machine learning model to the scenario profile to generate at least one target associated with the scenario, wherein the at least one target includes a measurable desired outcome, prompting 1340 for a user selection from the at least one target, applying 1350 a second trained machine learning model to the scenario profile and the user selection from the at least one target to generate at least one candidate innovation predicted to achieve the achieve the measureable desired outcome, obtaining 1360 descriptive information related to the at least one candidate innovation, and presenting 1370 the descriptive information related to the at least one candidate innovation to a user.

Figure 14:
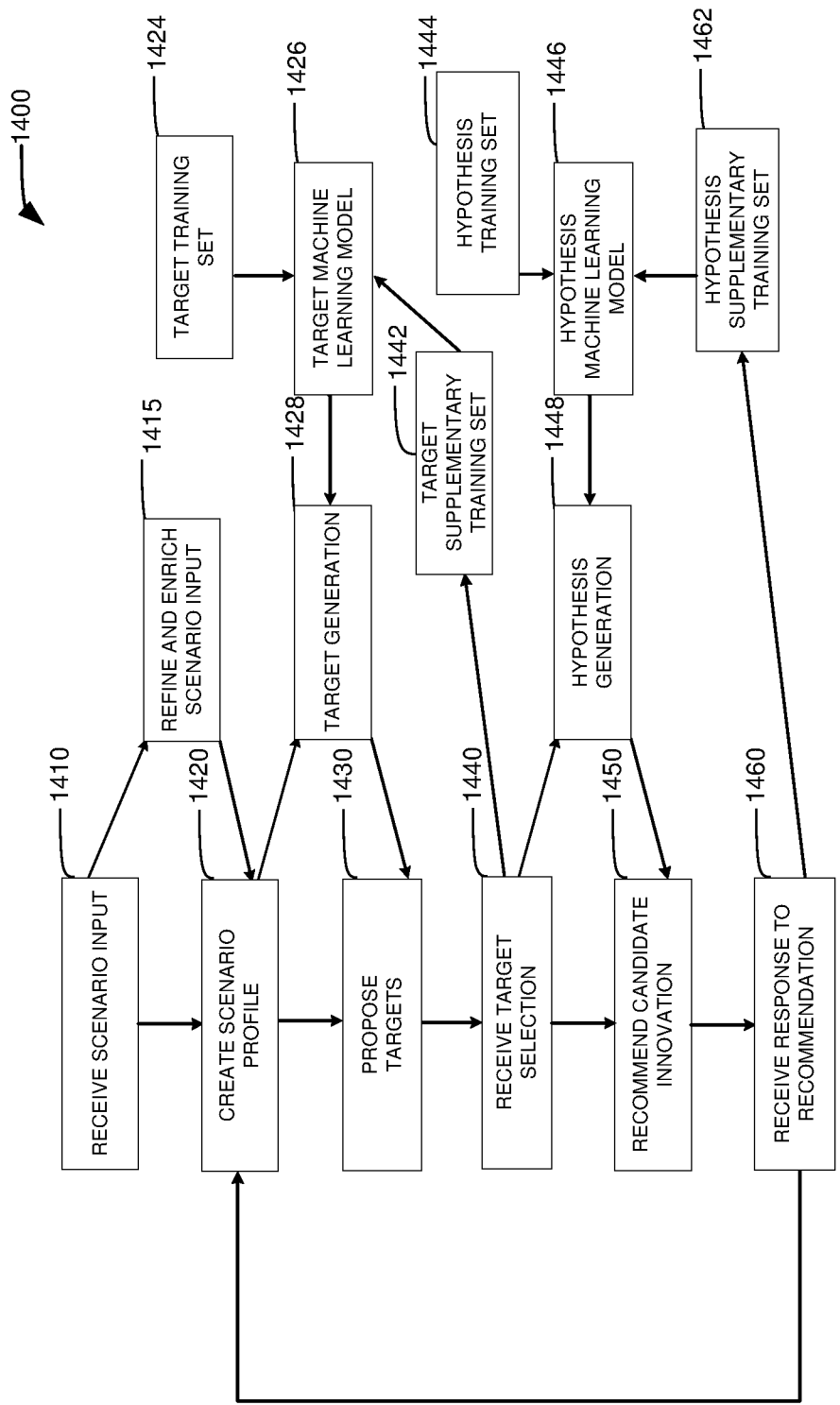
FIG. 14 is an illustration of a machine learning process performed by the machine learning server of FIGS. 2-5 in accordance with a first embodiment.

FIG. 14 is an illustration of a machine learning process 1400 performed by the machine learning server of FIGS. 2-5 in accordance with a first embodiment. Process 1400 depicts an example embodiment wherein the machine learning server receives 1410 a scenario input and creates 1420 a scenario profile. In some examples, the scenario profile is created 1420 by refining and enriching 1415 the scenario input in accordance with the methods described herein. The machine learning server also generates targets 1428 based on a target machine learning model 1426 trained by target training set 1424. As described below, the target machine learning model 1426 is also trained using feedback from a user in a target supplementary training set 1442. Based on such target generation, the machine learning server proposes 1430 targets to a user. The machine learning server receives 1440 an input from a user in the form of a target selection (or rejection) of the targets provided. Based on such selection or rejection, the machine learning server trains on user input which becomes target supplementary training set 1442. The machine learning server also generates hypotheses 1448 based on a hypothesis machine learning model 1446 trained by hypothesis training set 1444. As described below, the hypothesis machine learning model 1446 is also trained using feedback from a user in a hypothesis supplementary training set 1462. Based on such hypothesis generation, and on the targets that resulted from the above processes, the machine learning server 1450 applies the hypotheses to recommend candidate innovations to a user. The machine learning server receives 1460 an input from a user in the form of a hypothesis selection (or rejection) of the hypotheses provided. Based on such selection or rejection, the machine learning server trains on user input which becomes target supplementary training set 1462. If the user rejects all of the hypotheses provided, the machine learning server restarts the 1400 process.

Figure 15:
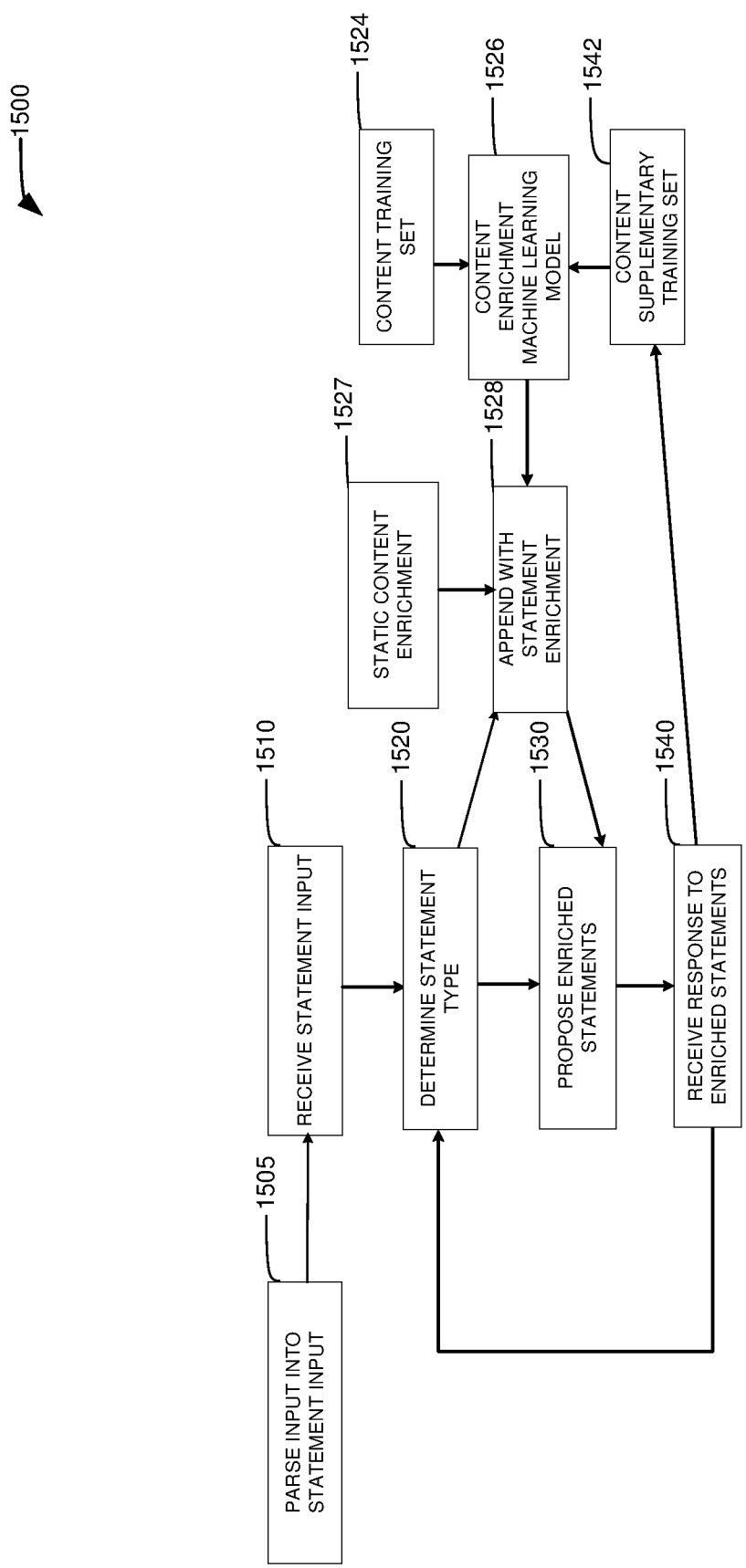
FIG. 15 is an illustration of a machine learning process performed by the machine learning server of FIGS. 2-5 in accordance with a second embodiment.

FIG. 15 is an illustration of a machine learning process 1500 performed by the machine learning server of FIGS. 2-5 in accordance with a second embodiment. Specifically, process 1500 depicts content enrichment of statements 1510 using a content enrichment learning model 1526. Machine learning server receives statement input 1510. In some examples, statement input 1510 is obtained after parsing statement input from user input 1505. This approach may be appropriate if the input is complex, voluminous, re-ordered or pre-processed for more efficient processing. Machine learning server determines 1520 a statement type based on statement input 1510, using classification, entity-extraction, a natural language processing similarity system, or other type-determination subroutine; Machine learning server appends 1528 statement input 1510 with statement enrichment. Statement enrichment may be provided by static content enrichment 1527 which may represent standardized content that is not changing and may relate to statement input 1510 and any classification thereof. Statement enrichment may also be provided by dynamic content enrichment provided by content enrichment machine learning model 1526 which trains on a content training set 1524 and, in some examples, on content supplementary training set 1542, described below. Machine learning server proposes 1530 enriched statements to a user and receives 1540 a response from the user indicating whether the user accepts or rejects such enrichment. The user response may be used to create content supplementary training set 1542. The output of process 1500 may be applied by the system to content (such as text, media, or source input of any kind) that when enriched improve the ability of the expert machine learning system to predict targets and predict candidate innovations. For example, such enrichment can be provided in the enrichment of scenario input 1410 (shown in FIG. 14) or applied using a transformer in the machine learning systems of FIGS. 2-5.

Figure 16:
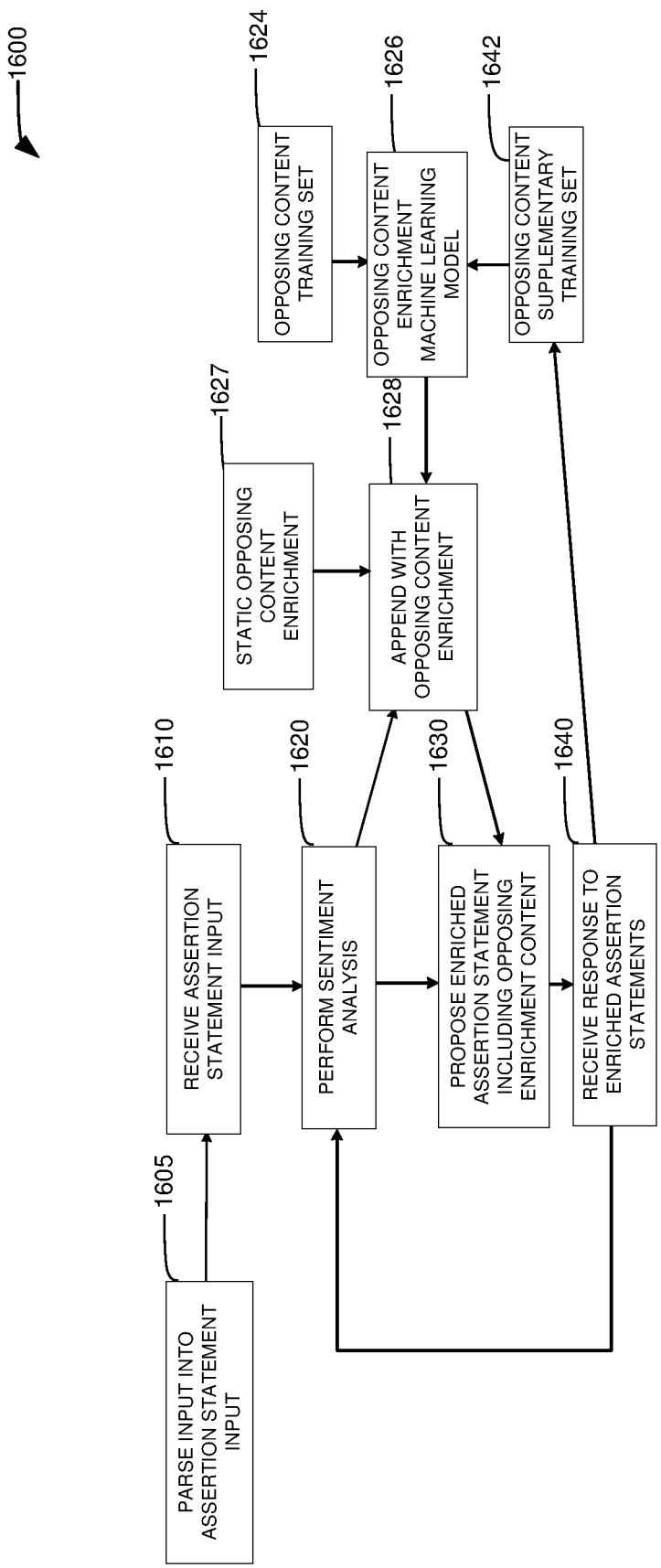
FIG. 16 is an illustration of a machine learning process performed by the machine learning server of FIGS. 2-5 in accordance with a third embodiment.

FIG. 16 is an illustration of a machine learning process 1600 performed by the machine learning server of FIGS. 2-5 in accordance with a third embodiment. Specifically, process 1600 depicts sentiment enrichment (or negative-to positive enrichment) of statements 1610 using an opposing content enrichment learning model 1626 or a negative-to-positive content enrichment learning model. Machine learning server receives assertion statement input 1610. In some examples, assertion statement input 1610 is obtained after parsing assertion statement input from user input 1605. This approach may be appropriate if the input is complex, voluminous, re-ordered or pre-processed for more efficient processing. Machine learning server performs sentiment analysis 1620, or alternatively performs sentiment analysis on statements 1610, and determines a sentiment type indicating whether an assertion is positive or negative. Machine learning server appends 1628 assertion statement input 1620 with opposing content enrichment. For example, the machine learning system may identify an assertion statement phrased negatively and identifying a problem, and identify content that is responsive and positive, and indicates a solution. Opposing statement enrichment (or negative-to-positive enrichment) may be provided by static opposing content enrichment 1627 which may represent standardized opposing content that is not changing and may relate to assertion statement input 1610 and any classification thereof. Opposing statement enrichment may also be provided by dynamic opposing content enrichment provided by opposing content enrichment machine learning model 1626 (or negative-to-positive machine learning model) which trains on an opposing content training set 1624 and, in some examples, on opposing content supplementary training set 1642, described below. Machine learning server proposes 1630 enriched assertion statements to a user and receives 1640 a response from the user indicating whether the user accepts or rejects such opposing enrichment. The user response may be used to create opposing content supplementary training set 1642. The output of process 1600 may be applied by the system to any sources that, when supplied with negative-to-positive statement enrichment, improve the ability of the system to predict candidate innovations or targets. For example, such enrichment can be provided in the enrichment of scenario input 1410 (shown in FIG. 14) or applied using a transformer in the machine learning systems of FIGS. 2-5.

Figure 17:
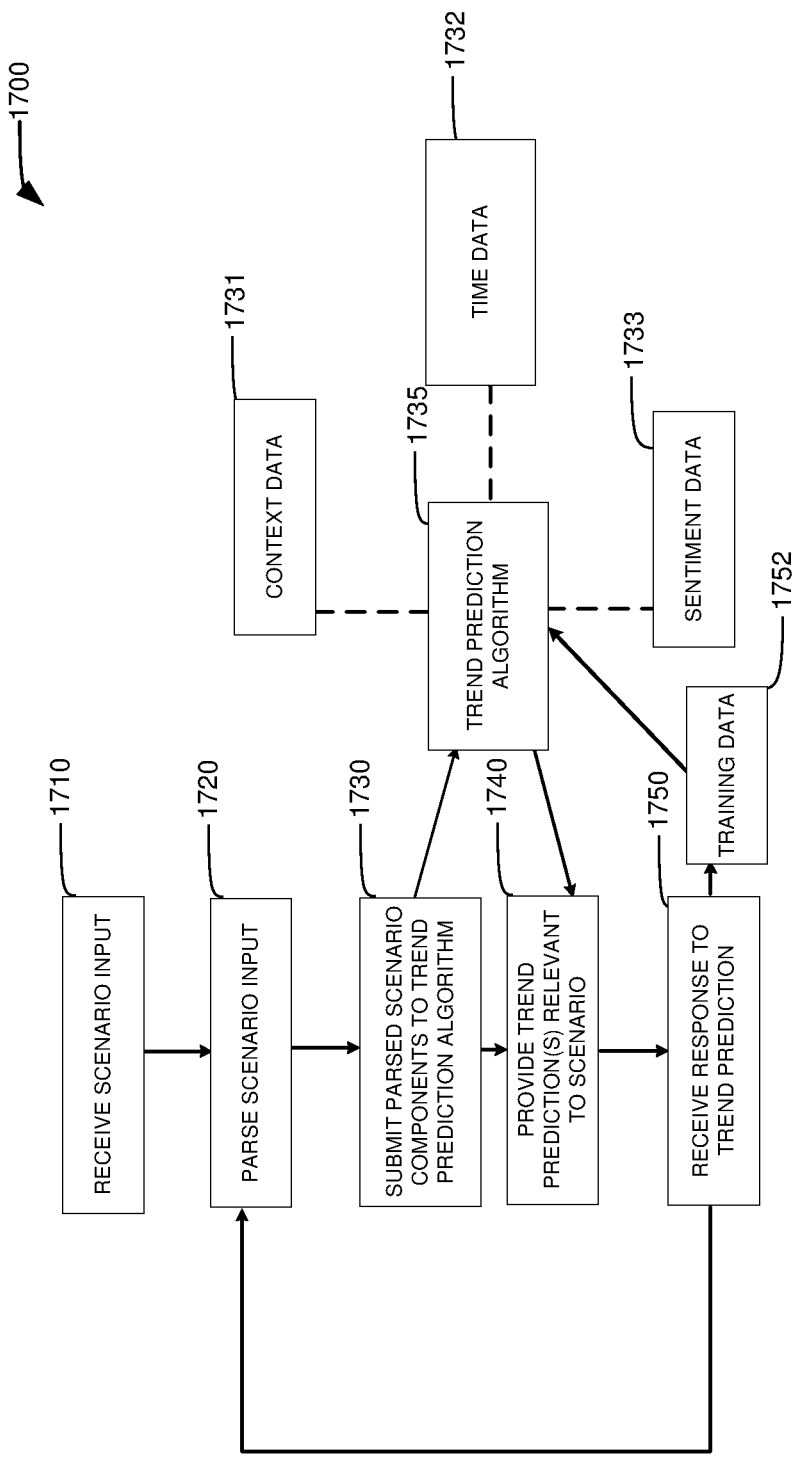
FIG. 17 is an illustration of a trend prediction and fine-tuning process performed by the machine learning server of FIGS. 2-5 in accordance with a first embodiment.

FIG. 17 is an illustration of a trend prediction and fine-tuning process 1700 performed by the machine learning server of FIGS. 2-5 in accordance with a first embodiment. Specifically, process 1700 describes a trend prediction approach of the machine learning server. Machine learning server receives scenario input 1710 and parses 1720 scenario input to obtain components such as sentence fragments and terms. Machine learning server submits 1730 the parsed elements of the scenario to the trend prediction algorithm 1735. Trend prediction algorithm 1735 is created and trained by receiving a corpus of information and processing fragments or components from each item of the corpus to determine at least (a) context data 1731; (b) time data 1732; and (c) sentiment data 1733. Additionally, each fragment or component may be classified using the tools described herein. As such, the trend prediction algorithm 1735 develops a constantly evolving model of trends related to particular terms, concepts, ideas, structures, methods, names, phrases, and other text with respect to sentiment in a particular industry. Trend prediction algorithm 1735 determines whether particular components are (a) more popular; (b) less popular; (c) well-known; and/or (d) less referenced in contexts, over a time period. Trend prediction algorithm 1735 may also detect the ability of a component to evolve or grow outside a context into a second context, such as when a term moves from being used in one field to its being used in a second field. Machine learning server applies trend prediction algorithm 1735 to provide 1740 trend predictions relevant to a scenario, using the classification approaches described herein. Machine learning server also receives 1750 a response to the trend prediction from the user that may be used to create training data 1752 to refine trend prediction algorithm 1735.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A. The term subset does not necessarily require a proper subset. In other words, a first subset of a first set may be coextensive with (equal to) the first set.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are the BLUETOOTH wireless networking standard from the Bluetooth Special Interest Group and IEEE Standard 802.15.4.

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave). The term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), RDF (resource description framework), CSV (comma separated values) or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A machine learning expert system for predicting that innovations will meet target goals in one or more scenarios, the machine learning expert system comprising:
   a processor; and
   a memory in communication with the processor and storing processor-executable instructions that, when executed by the processor, configure the processor to:
   receive a user input related to a scenario;
   define a scenario profile based on the user input;
   apply a first trained machine learning model to the scenario profile to generate at least one target associated with the scenario, wherein the at least one target includes a measurable desired outcome;
   prompt for a user selection from the at least one target;
   apply a second trained machine learning model to the scenario profile and the user selection from the at least one target to generate at least one candidate innovation predicted to achieve the achieve the measureable desired outcome;
   obtain descriptive information related to the at least one candidate innovation; and
   present the descriptive information related to the at least one candidate innovation to a user.

2. A machine learning expert system as set forth in claim 1, wherein the processor is further configured to:
   obtain a pool of targets;
   receive a training user input related to a training scenario;
   define a training scenario profile based on the training user input;
   apply a first machine learning algorithm to the scenario to identify a selection of the pool of targets predicted to be responsive to the training scenario profile based on semantic correlation or attention-mechanism based transformation;
   receive a target training response indicating whether the selection of the pool of targets relates to the training scenario profile; and
   train a first machine learning model as the first trained machine learning model based on the target training response defining relationships between the training response and the training scenario.

3. A machine learning expert system as set forth in claim 1, wherein the processor is further configured to:
   obtain a pool of hypotheses;
   receive a training user input related to a training scenario and a training target;
   define a training hypothesis model based on the training user input;
   apply a second machine learning algorithm to the scenario to identify a selection of the pool of hypotheses predicted to be responsive to the training scenario and the training target, based on semantic correlation or attention-mechanism based transformation;
   receive a hypothesis training response indicating whether the selection of the pool of hypotheses relates to the training scenario and the training target; and
   train a second machine learning model as the second first trained machine learning model based on the hypothesis training response defining relationships between the hypothesis training response, the training scenario, and the training target.

4. A machine learning expert system as set forth in claim 1, wherein the processor is further configured to:
   receive the user input related to a scenario;
   identify a statement type associated with the user input;
   apply a third trained machine learning model to the user input to identify a set of enrichment content associated with the scenario and the statement type;
   append the user input with the set of enrichment content; and
   define the scenario profile based on the appended user input.

5. A machine learning expert system as set forth in claim 4, wherein the processor is further configured to:
   obtain a set of training enrichment content;
   receive a training user input related to a training scenario;
   apply a third machine learning algorithm to the training scenario to identify a selection of the set of training enrichment content predicted to be responsive to the training scenario, based on application of a natural language processing algorithm;
   receive an enrichment training response indicating whether the selection of the set of training enrichment content relates to the training scenario; and
   train a third machine learning model as the second first trained machine learning model based on the enrichment training response defining relationships between the enrichment training response and the training scenario.

6. A machine learning expert system as set forth in claim 1, wherein the processor is further configured to:
   apply the second trained machine learning model and a trend prediction algorithm to the scenario profile and the user selection from the at least one target to generate the at least one candidate innovation predicted to achieve the achieve the measureable desired outcome, wherein the at least one candidate innovation is related to a trend predicted by the trend prediction algorithm.

7. A machine learning expert system as set forth in claim 6, wherein the processor is further configured to:
   receive a corpus of source information, wherein each of the corpus is associated with a time period;
   parse each of the corpus of source information to identify a plurality of sentence fragments and the associated time period;
   identify a context associate with each of the sentence fragments;
   apply a sentiment analysis algorithm to determine a related sentiment associated with each of the sentence fragment; and
   define a model for the trend prediction algorithm based on the sentiment and time period associated with each of the sentence fragments, wherein the model describes trend in opinion of the sentence fragment for each context over time.

8. A machine learning expert system as set forth in claim 1, wherein the processor is further configured to:
receive the user input related to a scenario;
apply a fourth trained machine learning model to the user input to identify a set of parts associated with the scenario; and
define the scenario profile based at least partially on the set of parts.

9. A method for predicting that innovations will meet target goals in one or more scenarios, the method comprising:
receiving a user input related to a scenario;
defining a scenario profile based on the user input;
applying a first trained machine learning model to the scenario profile to generate at least one target associated with the scenario, wherein the at least one target includes a measurable desired outcome;
prompting for a user selection from the at least one target;
applying a second trained machine learning model to the scenario profile and the user selection from the at least one target to generate at least one candidate innovation predicted to achieve the achieve the measureable desired outcome;
obtaining descriptive information related to the at least one candidate innovation; and
presenting the descriptive information related to the at least one candidate innovation to a user.

10. The method of claim 9, further comprising:
obtaining a pool of targets;
receiving a training user input related to a training scenario;
defining a training scenario profile based on the training user input;
applying a first machine learning algorithm to the scenario to identify a selection of the pool of targets predicted to be responsive to the training scenario profile based on semantic correlation or attention-mechanism based transformation;
receiving a target training response indicating whether the selection of the pool of targets relates to the training scenario profile; and
training a first machine learning model as the first trained machine learning model based on the target training response defining relationships between the training response and the training scenario.

11. The method of claim 9, further comprising:
obtaining a pool of hypotheses;
receiving a training user input related to a training scenario and a training target;
defining a training hypothesis model based on the training user input;
applying a second machine learning algorithm to the scenario to identify a selection of the pool of hypotheses predicted to be responsive to the training scenario and the training target, based on semantic correlation or attention-mechanism based transformation;
receiving a hypothesis training response indicating whether the selection of the pool of hypotheses relates to the training scenario and the training target; and
training a second machine learning model as the second first trained machine learning model based on the hypothesis training response defining relationships between the hypothesis training response, the training scenario, and the training target.

12. The method of claim 9, further comprising:
receiving the user input related to a scenario;
identifying a statement type associated with the user input;
applying a third trained machine learning model to the user input to identify a set of enrichment content associated with the scenario and the statement type;
appending the user input with the set of enrichment content; and
defining the scenario profile based on the appended user input.

13. The method of claim 12, further comprising:
obtaining a set of training enrichment content;
receiving a training user input related to a training scenario;
applying a third machine learning algorithm to the training scenario to identify a selection of the set of training enrichment content predicted to be responsive to the training scenario, based on application of a natural language processing algorithm;
receiving an enrichment training response indicating whether the selection of the set of training enrichment content relates to the training scenario; and
training a third machine learning model as the second first trained machine learning model based on the enrichment training response defining relationships between the enrichment training response and the training scenario.

14. The method of claim 9, further comprising:
applying the second trained machine learning model and a trend prediction algorithm to the scenario profile and the user selection from the at least one target to generate the at least one candidate innovation predicted to achieve the achieve the measureable desired outcome, wherein the at least one candidate innovation is related to a trend predicted by the trend prediction algorithm.

15. The method of claim 14, further comprising:
receiving a corpus of source information, wherein each of the corpus is associated with a time period;
parsing each of the corpus of source information to identify a plurality of sentence fragments and the associated time period;
identifying a context associate with each of the sentence fragments;
applying a sentiment analysis algorithm to determine a related sentiment associated with each of the sentence fragment; and
defining a model for the trend prediction algorithm based on the sentiment and time period associated with each of the sentence fragments, wherein the model describes trend in opinion of the sentence fragment for each context over time.

16. The method of claim 9, further comprising:
receiving the user input related to a scenario;
applying a fourth trained machine learning model to the user input to identify a set of parts associated with the scenario; and
defining the scenario profile based at least partially on the set of parts.

17. A machine learning server for predicting that innovations will meet target goals in one or more scenarios, the machine learning server comprising a processor and a memory, the processor is configured to:
receive a user input related to a scenario;
define a scenario profile based on the user input;
apply a first trained machine learning model to the scenario profile to generate at least one target associated with the scenario, wherein the at least one target includes a measurable desired outcome;

prompt for a user selection from the at least one target;

apply a second trained machine learning model to the scenario profile and the user selection from the at least one target to generate at least one candidate innovation predicted to achieve the achieve the measureable desired outcome;

obtain descriptive information related to the at least one candidate innovation; and present the descriptive information related to the at least one candidate innovation to a user.

18. The machine learning server as set forth in claim 17, wherein the processor is further configure to:

obtain a pool of targets;

receive a training user input related to a training scenario;

define a training scenario profile based on the training user input;

apply a first machine learning algorithm to the scenario to identify a selection of the pool of targets predicted to be responsive to the training scenario profile based on semantic correlation or attention-mechanism based transformation;

receive a target training response indicating whether the selection of the pool of targets relates to the training scenario profile; and train a first machine learning model as the first trained machine learning model based on the target training response defining relationships between the training response and the training scenario.

19. The machine learning server of claim 17, wherein the processor is further configured to:

obtain a pool of hypotheses;

receive a training user input related to a training scenario and a training target;

define a training hypothesis model based on the training user input;

apply a second machine learning algorithm to the scenario to identify a selection of the pool of hypotheses predicted to be responsive to the training scenario and the training target, based on semantic correlation or attention-mechanism based transformation;

receive a hypothesis training response indicating whether the selection of the pool of hypotheses relates to the training scenario and the training target; and train a second machine learning model as the second first trained machine learning model based on the hypothesis training response defining relationships between the hypothesis training response, the training scenario, and the training target.

20. The machine learning server of claim 17, wherein the processor is further configured to:

receive the user input related to a scenario;

identify a statement type associated with the user input;

apply a third trained machine learning model to the user input to identify a set of enrichment content associated with the scenario and the statement type;

append the user input with the set of enrichment content; and define the scenario profile based on the appended user input.

* * * * *